US006691734B2

(12) United States Patent
Beals et al.

(10) Patent No.: US 6,691,734 B2
(45) Date of Patent: Feb. 17, 2004

(54) METHODS AND SYSTEMS FOR INSTALLING CABLE AND CONDUIT IN PIPELINES

(75) Inventors: Scott A. Beals, Los Angeles, CA (US); Ronald D. Hammer, Los Angeles, CA (US); Robert E. Evans, Pasadena, CA (US); Kevin Leeds, Los Angeles, CA (US)

(73) Assignee: Sempra Fiber Links, San Diego, CA (US)

( * ) Notice: Subject to any disclaimer, the term of this patent is extended or adjusted under 35 U.S.C. 154(b) by 0 days.

(21) Appl. No.: 10/158,414

(22) Filed: May 29, 2002

(65) Prior Publication Data

US 2002/0189671 A1 Dec. 19, 2002

Related U.S. Application Data

(63) Continuation-in-part of application No. 09/973,961, filed on Oct. 9, 2001, which is a continuation-in-part of application No. 09/876,802, filed on Jun. 7, 2001, which is a continuation-in-part of application No. 09/685,236, filed on Oct. 10, 2000, now Pat. No. 6,536,463.

(51) Int. Cl.[7] .............................. H02G 1/08; H02G 9/06; F16L 37/22; F16L 37/08

(52) U.S. Cl. ............. 137/317; 137/15.12; 254/134.3 R; 254/134 FT; 254/134.4; 285/308; 285/316; 285/317; 405/154.1; 405/183.5; 405/184

(58) Field of Search .................... 137/15.12, 15.13, 137/15.14, 317, 318; 138/97, 155; 254/134.3 R, 134.3 FT, 134.4; 405/154.1, 155, 156, 157, 158, 159, 168.3, 174, 177, 183.5, 184; 285/307, 308, 316, 317; 385/100; 403/321, 322.2, 325, 326, 327

(56) References Cited

U.S. PATENT DOCUMENTS 920,455 A  5/1909  Greenan 1,658,887 A  2/1928  Dotzauer (List continued on next page.)

FOREIGN PATENT DOCUMENTS

DE    23 55 383 A1    5/1975
DE    3140928 A1      5/1983

(List continued on next page.)

OTHER PUBLICATIONS

RM Consulting, Final Report *"Fiber Optic Cable in Live Natural Gas Lines"*, Phase 11A, Nov. 29, 1999, 3 pages.
Gregor, Paul E et al., Alcatel—*Optical Fiber Cable Links With Gas Pipelines As An Alternative Telecommunications Route Technology*, International Wire Cable Symposium Proceedings 1999, 7 pages.

(List continued on next page.)

Primary Examiner—George L. Walton
(74) Attorney, Agent, or Firm—Perkins Coie LLP

(57) ABSTRACT

A method, system and tools for introducing a fiber optic conduit into a pressurized gas pipeline includes the step of introducing a translating member into the pressurized gas pipeline via an entry port in a first fitting attached to the pressurized gas pipeline. Tools are deployed within a first pressure lock housing attached to the first fitting by using a first manipulator located in the first air lock housing. The translating member, such as a duct rod, is advanced within the pressurized gas pipeline by a driving mechanism until a second drilling fitting is reached. The translating member is attached to a fiber optic conduit or cable. The duct rod and fiber optic conduit are then pulled back through the pressurized gas pipeline. Extractor tools extending through seals in the pressure lock housing engage with and withdraw the duct rod. Alternatively, first and second duct rods may be pushed towards each other from the first and second fittings. End elements on the duct rods engage each other. The first duct rod is then pulled back, pulling the second duct rod with it. This technique can double the installation length available by pushing duct rod through the pipeline.

31 Claims, 17 Drawing Sheets

OPERATION

U.S. PATENT DOCUMENTS

| Patent | | Date | Inventor |
|---|---|---|---|
| 2,460,352 A | * | 2/1949 | Jensen .................. 285/308 |
| 2,930,584 A | | 3/1960 | Hensley et al. |
| 3,034,766 A | | 5/1962 | Hamrick |
| 3,897,089 A | * | 7/1975 | Leichsenring et al. ...... 285/316 |
| 4,090,534 A | | 5/1978 | Martin et al. |
| 4,169,486 A | | 10/1979 | Otteman |
| 4,232,981 A | | 11/1980 | Lee |
| 4,261,204 A | | 4/1981 | Donaldson |
| 4,366,945 A | * | 1/1983 | Blauenstein ............. 285/316 |
| 4,427,112 A | | 1/1984 | Di Giovanni et al. |
| 4,518,817 A | | 5/1985 | Kirby et al. |
| 4,649,948 A | | 3/1987 | Hudson |
| 4,756,510 A | | 7/1988 | Klamm et al. |
| 4,856,937 A | | 8/1989 | Grocott et al. |
| 4,869,301 A | | 9/1989 | Ohmi et al. |
| 4,892,442 A | | 1/1990 | Shoffner |
| 4,917,539 A | | 4/1990 | De la Salle |
| 5,042,528 A | | 8/1991 | England et al. |
| 5,090,665 A | | 2/1992 | Walters et al. |
| 5,116,086 A | * | 5/1992 | Psajd .................. 285/316 |
| 5,121,644 A | | 6/1992 | Grey et al. |
| 5,137,047 A | | 8/1992 | George |
| 5,143,353 A | | 9/1992 | Sano et al. |
| 5,156,376 A | | 10/1992 | Spicer |
| 5,205,542 A | | 4/1993 | Keeble |
| 5,227,080 A | | 7/1993 | Berry |
| 5,360,291 A | | 11/1994 | Shimizu |
| 5,482,073 A | | 1/1996 | Winnie et al. |
| 5,612,499 A | | 3/1997 | Andrew et al. |
| 5,651,639 A | * | 7/1997 | Wentworth et al. ......... 405/184 |
| 5,660,202 A | | 8/1997 | Rush, Jr. et al. |
| 5,749,389 A | | 5/1998 | Ritrosi et al. |
| 5,778,919 A | | 7/1998 | Petrone |
| 5,807,026 A | * | 9/1998 | Valette .................. 405/158 |
| 5,884,384 A | | 3/1999 | Griffioen |
| 5,934,304 A | | 8/1999 | Peterson et al. |
| 5,971,035 A | | 10/1999 | Griffioen |
| 6,019,351 A | | 2/2000 | Allen |
| 6,056,004 A | | 5/2000 | Agnew |
| 6,130,975 A | | 10/2000 | Eyres |
| 6,152,496 A | * | 11/2000 | Kouda .................. 285/316 |
| 6,286,542 B1 | | 9/2001 | Morain et al. |
| 6,301,414 B1 | | 10/2001 | Liese et al. |
| 6,341,188 B1 | | 1/2002 | Serrander et al. |
| 2002/0114595 A1 | | 8/2002 | Potash |
| 2003/0068143 A1 | | 4/2003 | Martinez et al. |

FOREIGN PATENT DOCUMENTS

| | | |
|---|---|---|
| EP | 108 590 | 5/1984 |
| EP | 0978715 B1 | 2/2000 |
| EP | 795 942 B1 | 8/2000 |

OTHER PUBLICATIONS van Heugten, Wim H.H., "*Gastec Glass–in–gas method leads to considerable reduction in laying costs*", Gastec NV, 4 pages.

Reuters, Telecom stocks are exciting high growth investment opportunities. Mar. 1, 2000, 1 page.

Scott, Latayne C., Nortel Targeting Utilities Telecom Business, Apr. 21, 2000, 3 pages.

Gastec, "*Glass fiber Optic Cables in Gas Pipes*", Gastec 2000, 30 pages.

* cited by examiner

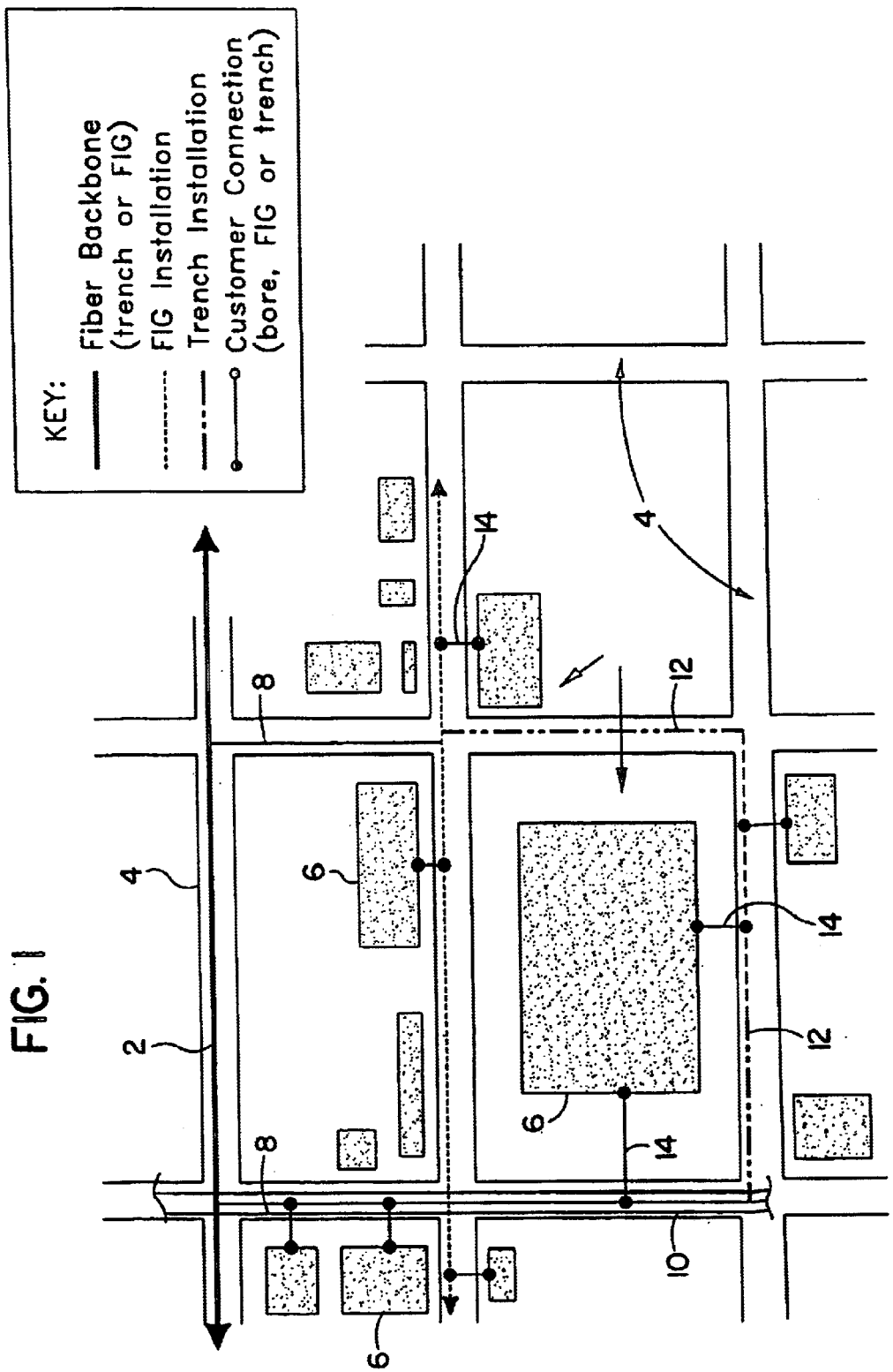

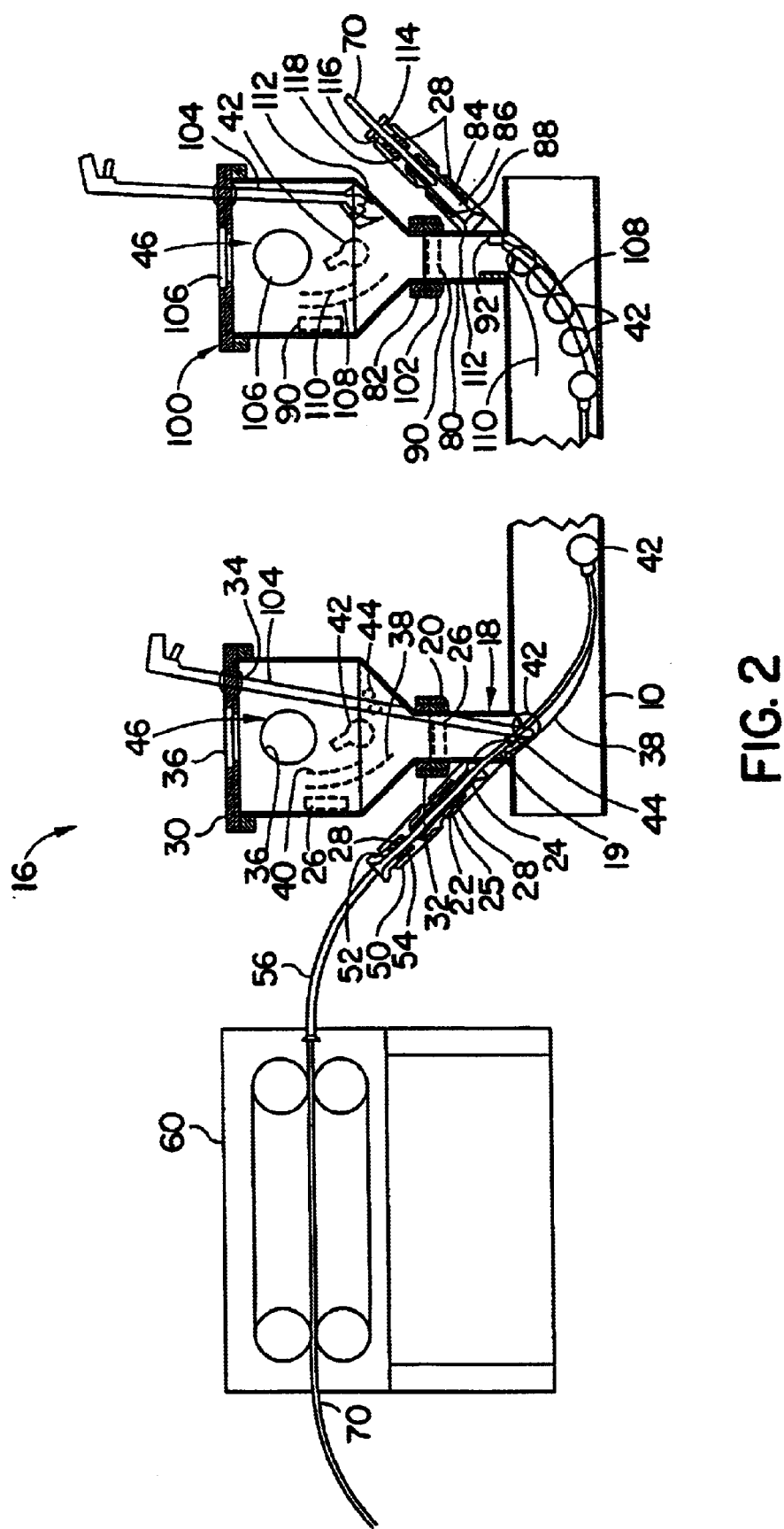

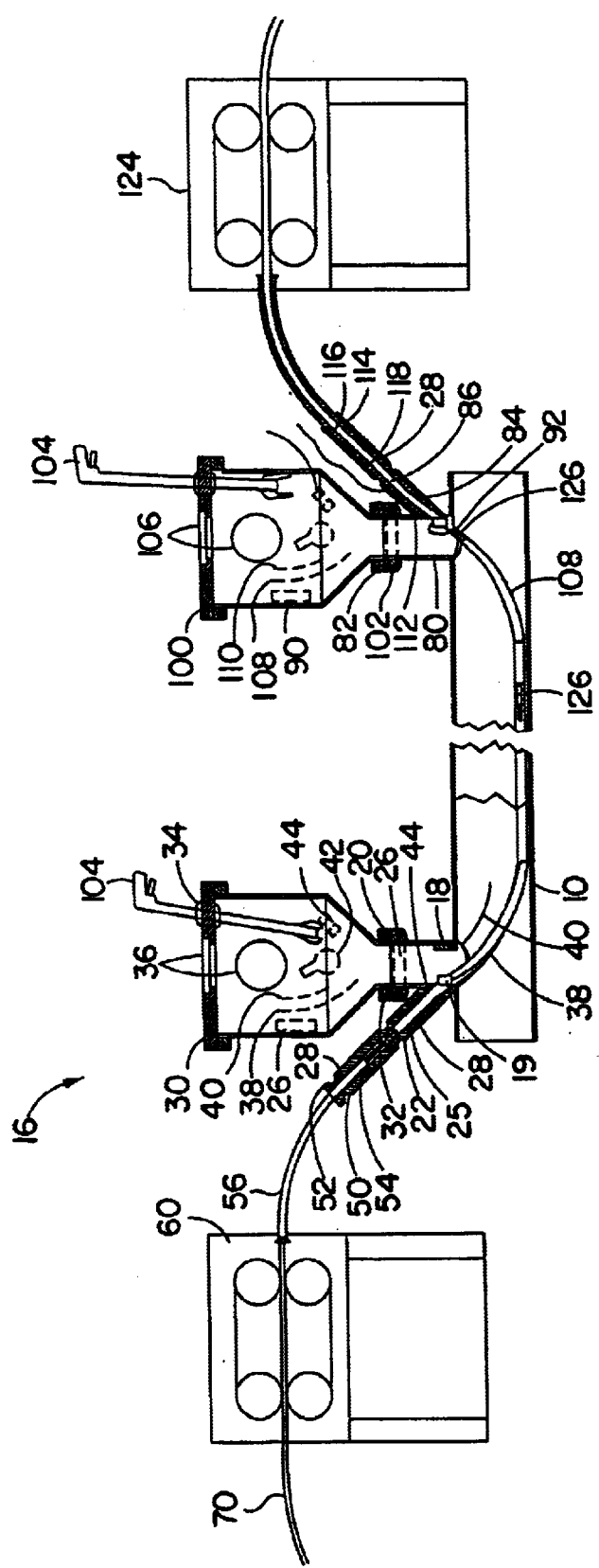

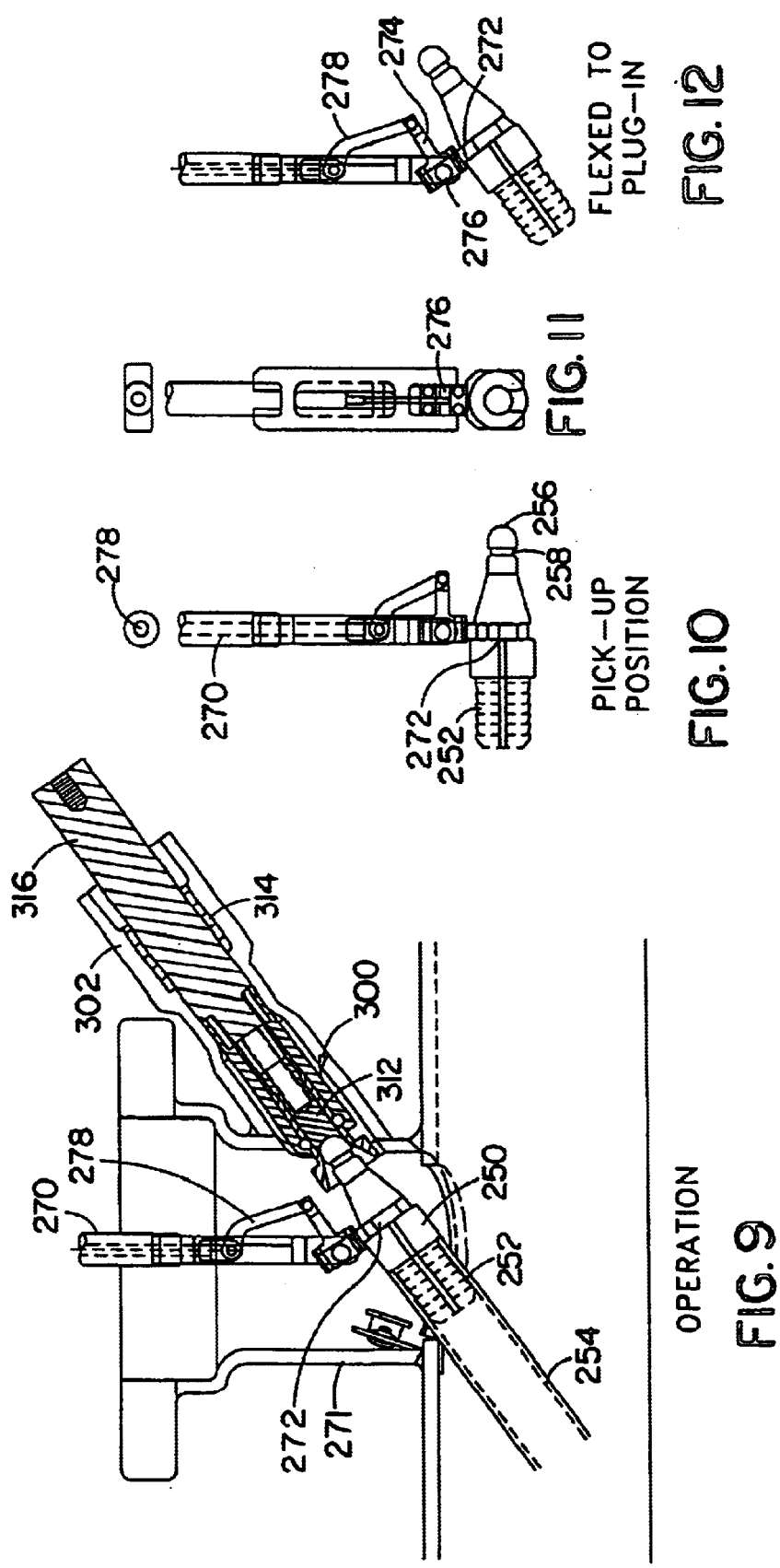

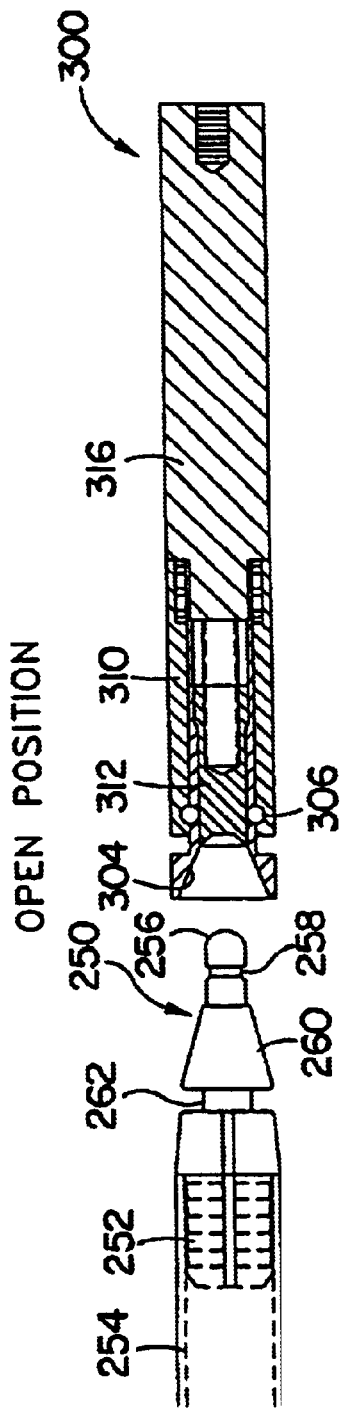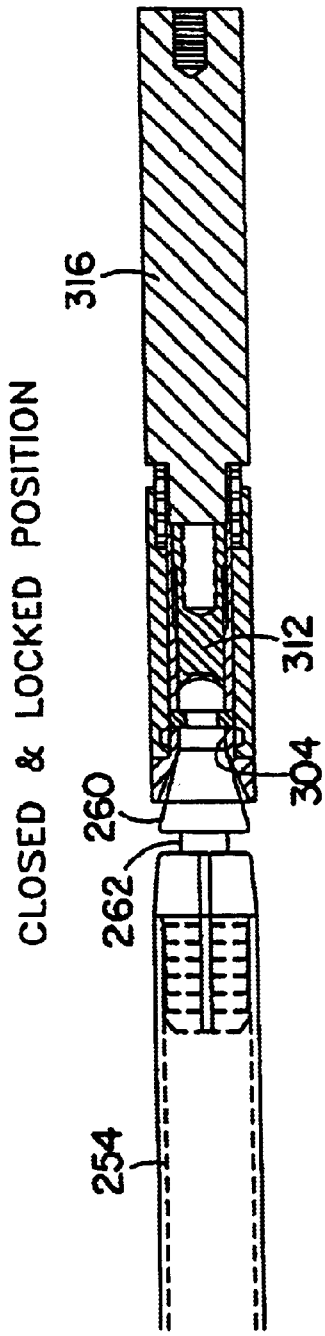

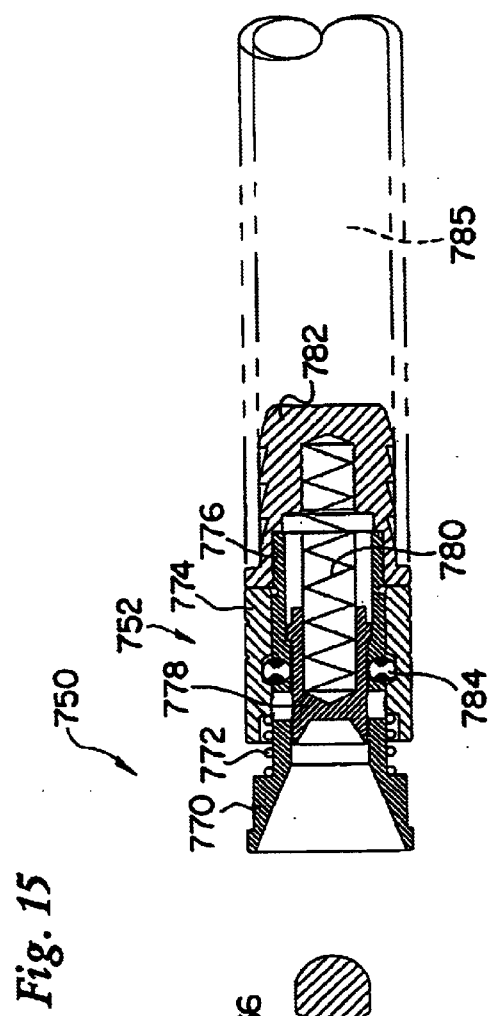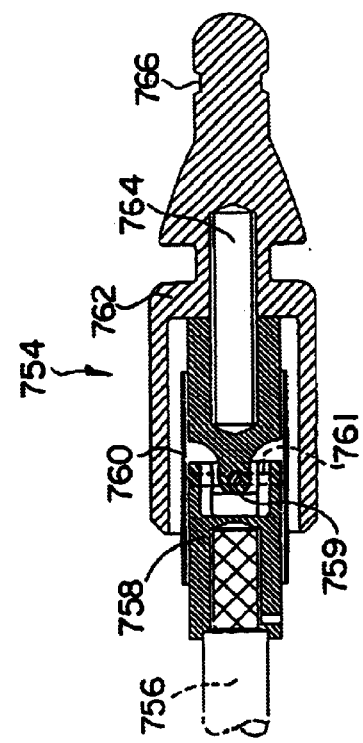
Fig. 15

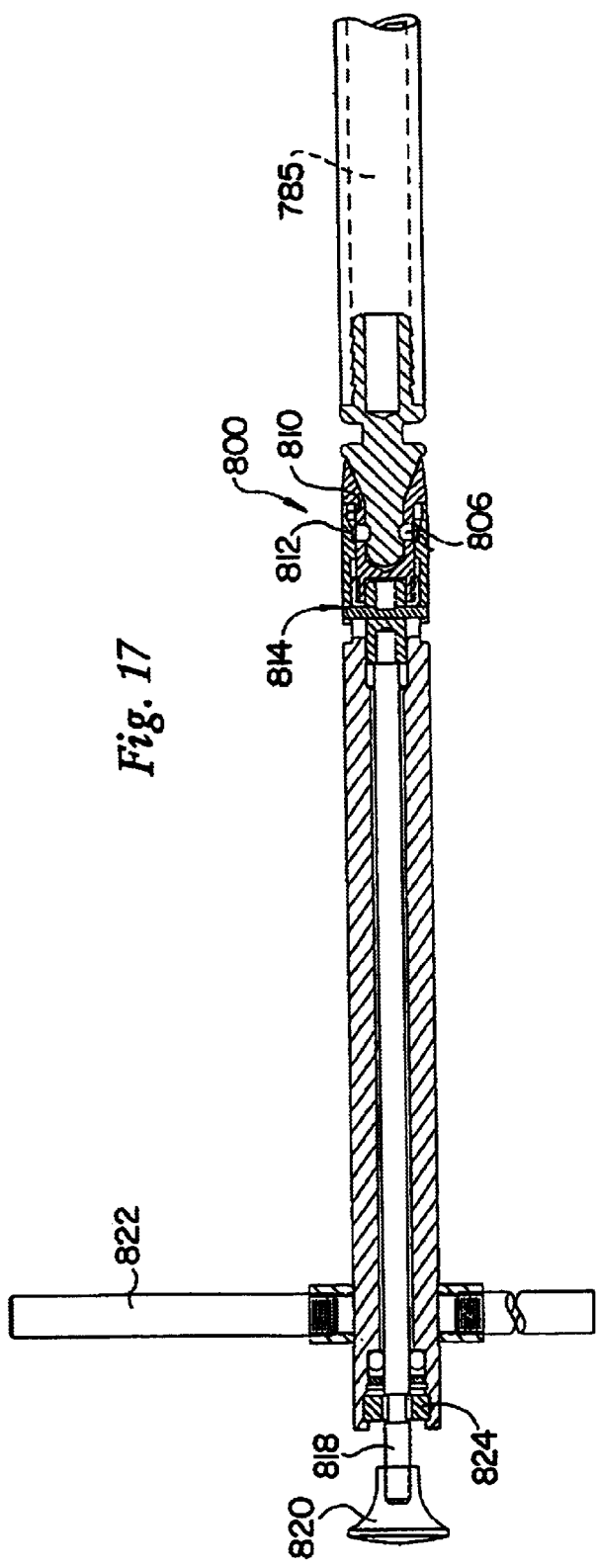
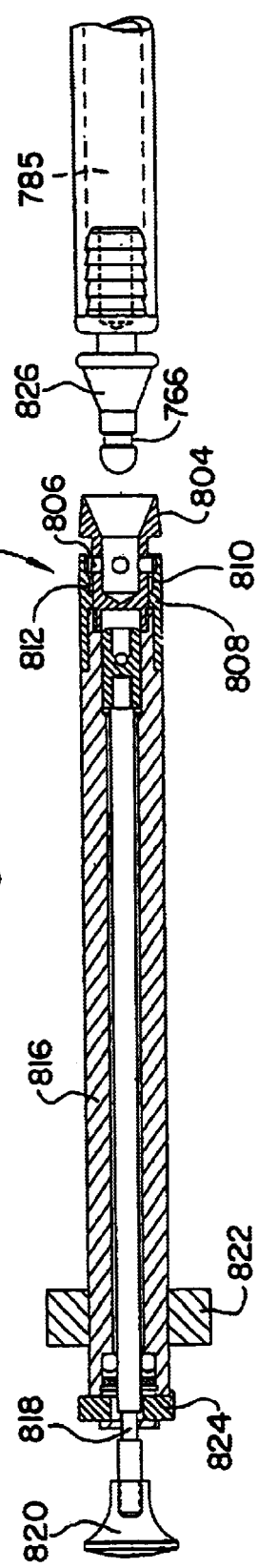

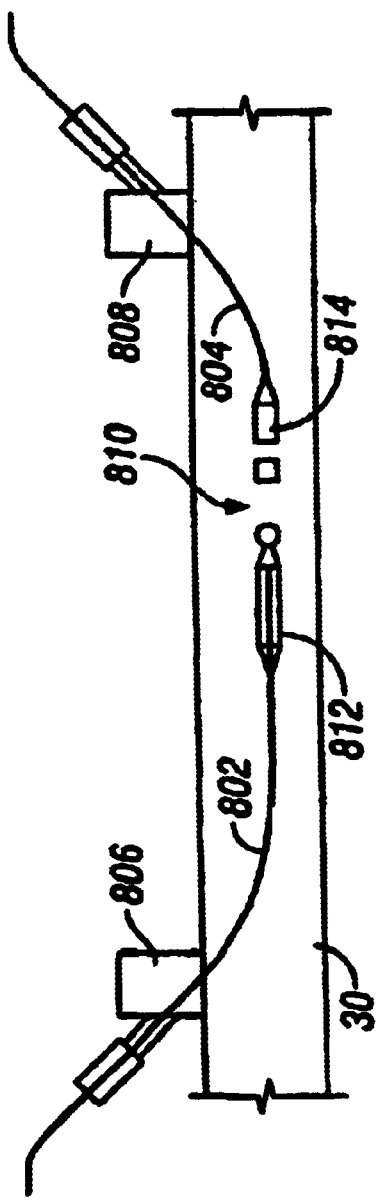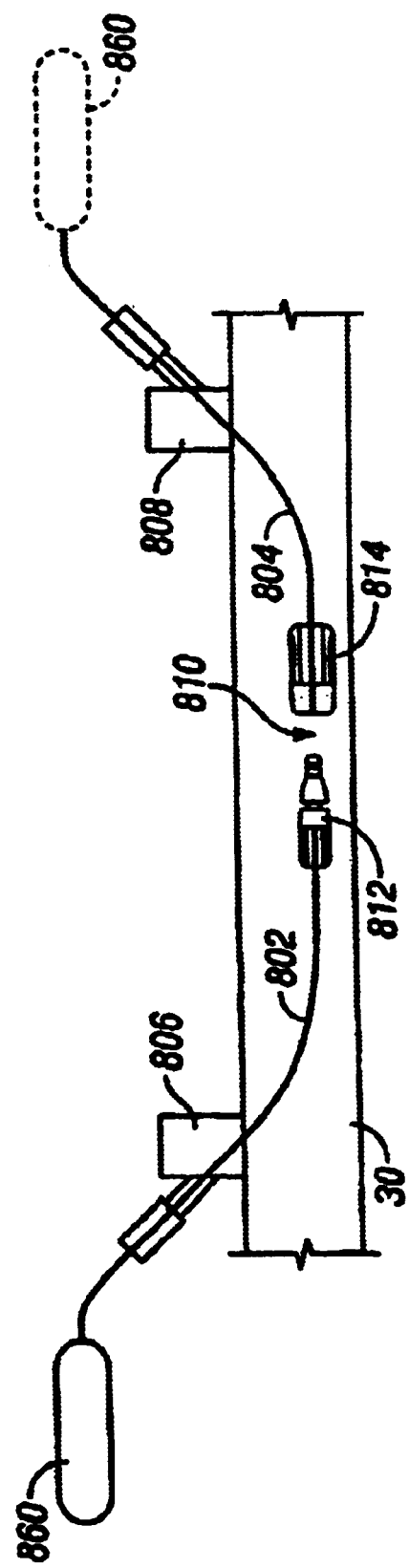
Fig. 21
Fig. 22

METHODS AND SYSTEMS FOR INSTALLING CABLE AND CONDUIT IN PIPELINES

This Application is a Continuation-in-Part of U.S. patent application Ser. No. 09/973,961, filed Oct. 9, 2001, and now pending, which is a Continuation-in-Part of U.S. patent application Ser. No. 09/876,802, filed Jun. 7, 2001, and now pending, which is a Continuation-in-Part of U.S. patent application Ser. No. 09/685,236, filed Oct. 10, 2000, now U.S. Pat. No. 6,536,46. These applications are incorporated herein by reference.

BACKGROUND OF THE INVENTION

The field of the invention is systems and methods for installing fiber optic cable or similar cables or conduits underground. More specifically, the invention relates to the installation of such cable or conduit into pressurized pipelines, such as natural gas pipelines.

With the tremendous growth of the Internet and telecommunications services in general, there has been a commensurate growth in the need to carry larger and larger volumes of data over existing and newly added communication lines. Existing copper-based communications lines, however, have a limited carrying capacity, or bandwidth, as compared to fiber optic cable. Conventional copper wires also suffer from the problem that the wire bundles are quite large as compared to their fiber optic counterparts. Additional copper wires could be installed to increase the overall capacity of a communications or data network. However, fiber optic cable is now preferred within the communications industry due to its significant advantages over copper wires.

Currently, in many countries, there are existing large scale fiber optic backbones that stretch across wide areas. Unfortunately, many businesses and consumers cannot connect to this fiber optic backbone because they are located some distance away from the main line. If copper-based lines are connected to the fiber optic backbone, the high speed and high bandwidth advantages of fiber optic cable are lost. In order to take advantage of the increased speed and bandwidth provided by fiber optic cable lines, shorter segment fiber optic lines need to be laid to reach these businesses and consumers.

Unfortunately, it is a difficult and costly procedure to lay fiber optic cable in developed regions where infrastructure such as roads, utilities, and the like are already in place. For example, it can be costly to obtain the requisite right-of-ways or easements from numerous different property owners. It can also be very costly to dig trenches to lay fiber optic cable. In addition, it is also often necessary to obtain the approval of various state and local government agencies before such work can begin. This can significantly increase the overall cost and delay the completion of the installation.

Existing gas pipelines have been considered as one potential conduit that can be used to carry fiber optic cable. By using existing gas pipelines, there is no need to obtain numerous right-of-ways or easements, since the fiber optic cable simply resides within the pipeline. In addition, long trenches do not have to be dug to lay the fiber optic cable. However, using gas pipelines as a route for fiber optic cable typically requires that sections or all of the pipeline be shut down for an extended period of time for installation of the cable. Even if the gas pipeline is not completely shut down, existing techniques interrupt the normal flow of gas.

In the past, various systems and methods have been used to install cable or conduit in liquid pipelines. These known systems and methods have met with varying degrees of success. However, these liquid pipeline systems are generally not well suited for use in gas pipelines. Providing adequate seals in gas pipelines is typically more difficult and requires sealing techniques which are different from those used with liquids. In addition, as liquids are much denser or heavier than gas, the large current or flow forces available in a liquid pipeline for carrying a drogue or similar devices, are not available in gas pipelines. In addition, the buoyant forces of a liquid pipeline, which can help to center and convey a drogue or conduit line, are not available in a gas pipeline. Hence, installing a conduit or cable into a gas pipeline presents unique engineering challenges. On the other hand, techniques which work for gas pipelines will generally also be useful with liquid pipelines.

Accordingly, there is a need for a relatively quick and inexpensive systems, tools, and methods of installing fiber optic cable, or conduit which can be used to house the cable, into existing pipelines such as natural gas pipelines.

BRIEF STATEMENT OF THE INVENTION

In a first aspect of the invention, and extractor system for installing a cable or conduit into a pipeline includes a receiver assembly and a nose assembly. The nose assembly has a nosepiece and the receiver assembly has a latching mechanism for latching onto the nosepiece. The receiver assembly also preferably has a guide section for guiding the nosepiece into the receiver assembly. In an alternative aspect, the nose assembly has a u-joint to better facilitate engagement between the nose piece and the receiver assembly.

In a second aspect of the invention, a duct rod assembly for use in installing a cable or conduit into a pipeline includes a duct rod, a nose piece on the duct rod, a gland body having a seal, with the duct rod extending through the seal in the gland body. A receiver assembly includes a latching mechanism for engaging onto the nose piece, when the nose piece and receiver assembly are engaged together. The gland body may optionally further include a threaded section adapted to engage onto a pipeline fitting.

In a third aspect, an extractor system for use in installing a cable or conduit into a pipeline includes an end plug attached to the cable or conduit and an end nose having a coupling feature. A coupler has a receptacle adapted to couple onto the end plug. The end plug preferably has a rounded end nose, a conical guide collar, and a coupler groove between the end nose and the guide collar. A conical guide may be provided on the receptacle to engage with the conical guide collar on the end plug.

In a fourth aspect, an extractor tool for extracting an end fitting through a pressure seal during installation of a cable or conduit into a pressurized gas pipeline includes an extractor tube, a handle attached adjacent a first end of the extractor tube, a lock rod axially displaceable within the extractor tube, and a tube collar section at a second end of the extractor tube. A socket is axially displaceable within the tube collar section. The socket is attached to the lock rod. Retainers in the socket move to engage an end fitting on a cable, conduit, or duct rod, when the end fitting is moved into the tube collar section.

In a fifth aspect a receiver assembly for engaging and extracting an end fitting on a cable, a conduit, or a duct rod, includes a pull bar, a handle attached adjacent a first end of the pull bar, and a socket extending into a sleeve attached to a second end of the pull bar. An insert is axially displaceable within the socket and biased into a first position by an insert spring. A sleeve spring urges the sleeve away from the second end of the pull bar and over the socket. A locking element is provided between the sleeve and the socket. A pawl is pivotally attached to the pull bar and moveable from a first position, wherein the sleeve is positioned at least partially over the pawl, to a second position, wherein the pawl locks the sleeve against movement towards the first end of the pull bar.

In a sixth aspect, a method for installing a cable or conduit into a pipeline includes the steps of routing a first line having a first end fitting into the pipeline, from a first location. A second line having a second end fitting is routed into the pipeline from a second location, until the second end fitting contacts the first end fitting, at an intermediate position within the pipeline, between the first and second locations. The first end fitting is then engaged with the second end fitting. The first line is pulled back until the second end fitting is adjacent to the first location. The end fittings may be an end plug and a mating receptacle, or they may be grappling fittings or components, or spiral fittings or components. Various equivalent end fittings which can engage and hold onto each other, while the lines are pulled through the pipeline, may be used. This method substantially doubles the pipeline routing length of conventional duct rod or conduit pushing methods, since two lines are routed or pushed towards each other from opposite ends of a pipeline segment.

The invention resides as well in sub-combinations of the methods and systems described. The tools and fittings described also constitute separate inventions to be claimed, apart from systems and methods. These items may also be provided as a kit.

It is an object of the invention to provide methods and systems for installing fiber optic or similar cable or conduits into existing pressurized gas pipelines without interrupting the flow of gas in the pipeline.

BRIEF DESCRIPTION OF THE DRAWINGS

FIG. 1 is a plan view of a geographical area that has installed fiber optic cable or conduit in underground pressurized gas pipelines.

FIG. 2 is a schematic view of the system and methods of the present invention, with an installation device pushing a duct rod and guide ball through a pressurized gas pipeline.

FIG. 3 is a schematic view of the system and methods of the present invention, with an installation device pulling the duct rod and fiber optic conduit back through the pressurized gas pipeline.

In FIGS. 6 and 7, the pipe fitting, valve, and air lock components are the same on the inlet and exit ends, although they are not fully illustrated on the inlet end. For purposes of illustration, the airlock on the inlet end of FIG. 6 is replaced with the pipe drilling or cutting machine, while in FIG. 7, a top view of the drilling fitting and the hot-tap gate valve is shown.

FIG. 9 is a section view of another embodiment for use with conduit.

FIG. 10 is a side view of the manipulator of FIG. 8 in the pick up position.

FIG. 11 is a front view thereof.

FIG. 12 is a side view of the manipulator of FIG. 9 in the plug in position.

FIG. 13 is a section view of an end coupler aligned for engagement with the conduit end shown in FIGS. 9–12.

FIG. 14 is a section view of the end coupler of an extraction tool and conduit end of FIG. 13 coupled together.

FIG. 15 is a section view of an extraction assembly for use with duct rod operations. A butt nose fitting is attached to a duct rod and an extractor fitting is attached to a conduit.

FIG. 16 is a section view of a manual extraction assembly tool for use with conduit operations, for example as shown in FIGS. 9–12, in the unlocked or disengaged position.

FIG. 17 is a section view thereof in the engaged position.

FIG. 21 is a schematic diagram of a first embodiment of a mid-pipeline connection conduit installation.

FIG. 22 is a schematic diagram of a second embodiment of a mid-pipeline connection conduit installation.

DETAILED DESCRIPTION OF THE DRAWINGS

Figure 4A:
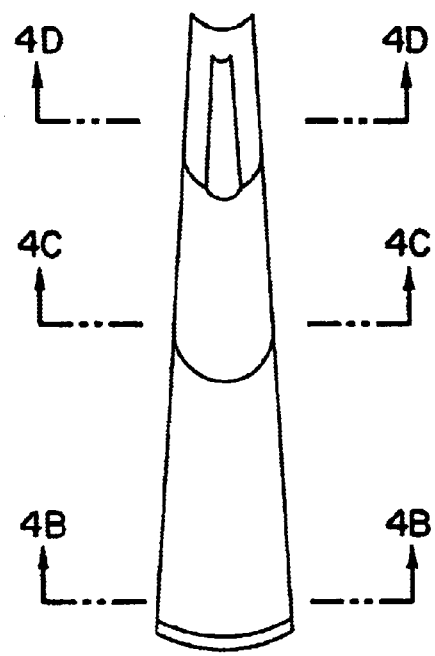
FIG. 4A is a front view of a guide trough.
Figure 4D:
FIGS. 4B, 4C and 4D are section views taken at lines 4B—4B, 4C—4C, and 4D—4D of FIG. 4A.
Figure 4C:
Figure 4B:

FIG. 1 illustrates a map or plan view of a portion of an urban area such as a city, town, university campus, etc. A main fiber optic backbone 2 runs underneath one or more of the streets 4. Various buildings 6 are dispersed in the vicinity of the main fiber optic backbone 2. These buildings 6 can be individual properties, or alternatively, the buildings 6 can be campuses consisting of multiple properties. Fiber optic conduit 8 that contains one or more bundles of fiber optic cable is shown branching from the main fiber optic backbone 2 under the streets 4. The fiber optic conduit 8 is located in pressurized gas pipelines 10 located underground. The fiber optic conduit 8 is installed in accordance with the methods and devices described in below.

Still referring to FIG. 1, in some of the streets 4 there are no existing pressurized gas pipelines 10, or the pipeline size or available capacity is such that it is not suited for installation of conduit or cable. In this case, the fiber optic conduit 8 is preferably installed in a conventional manner by digging trenches 12 or boring holes through which conduit can be installed. The trenches 12 are preferably dug to meet with existing pressurized gas pipelines 10. In order to get the fiber optic conduit 8 from the pressurized gas pipelines 10 to the buildings 6, individual customer connections 14 are installed to bring the fiber optic cable (contained within fiber optic conduit 8) directly to a customer site. In some instances, such as the larger building 6 shown in the center of FIG. 1, multiple customer connections 14 may be made.

The customer connections 14 may be installed in various ways. For example, a trench 12 can be dug to lay the fiber optic conduit 8 from the pressurized gas pipeline 10. Alternatively, a bore can be drilled or otherwise formed to route the fiber optic conduit 8 into a building. It is also possible that the fiber optic conduit 8 can be directly fed into the pressurized gas pipeline 10 leading to the building 6. This method may be more feasible (due to capacity limitations) where larger diameter service line pipes are used, for example, where the business 6 is a high volume user of natural gas.

Referring now to FIGS. 2 and 3, a system 16 is shown for the installation of fiber optic conduit. A first access or drilling fitting 18 is attached to the exterior of the pressurized gas pipeline 10, typically by welding. The first drilling fitting 18 includes a flange portion 20, and a side arm including an entry gland 22. The side arm is preferably at an angle of 30–40° to the pipeline, to clear holes while maximizing the feeding force in the direction of the pipeline, and to minimize bending of cable. The entry gland 22 and the first drilling fitting 18 connect into the interior or lumen of the pressurized gas pipeline 10. The entry gland 22 can include a bore 24 that at one end receives a split plug seal 44, if needed to temporarily seal the gland while changing fittings or packings. The entry gland 22 also includes a recess 25 for holding a temporary packing material 28 such as TEFLON (resinous fluorine polymers) or a permanent elastomer seal such as VITON (synthetic rubber). A first completion plug 26 is shown in phantom in the first drilling fitting 18. The first completion plug 26 is removable from the first drilling fitting 18 as described below. The angle of the entry/exit port and the side arm is preferably optimized to allow the maximum possible bend radius for the cable or conduit to produce the greatest amount of force in the direction of the pipe when pushing axially on the duct rod or conduit from outside the pipe.

A first pressure or air lock housing 30 is mounted to the flange portion 20 of the first drilling fitting 18, preferably via a flange and bolts 32. The first air lock housing 30 includes a interior portion or space 46 where various components and tools can be hung, placed in receivers or otherwise stored. A first manipulator 34 extends through the first air lock housing 30 into the space 46. Preferably, the first manipulator 34 includes one or more manipulator arms that can be rotated and/or extended at a wide angle from vertical within the first air lock housing 30. The first manipulator 34 is sealed against gas pressure when the first air lock housing 30 is pressurized. The first air lock housing 30 also includes viewing ports 36 in the top and side of the first air lock housing 30. The viewing ports 36 permit an operator to visually observe the interior portion of the first air lock housing 30 and first drilling fitting 18 and the internal portion of the pipeline in the vicinity where the access hole is drilled or cut.

As shown in dotted lines in FIG. 2, inside the first air lock housing 30 is the first completion plug 26, a first guide trough 38, a corner shield 40, a guide ball 42, and tapered split plugs 44. These items are movable or installable within the first air lock housing 30 via the first manipulator 34 and can be used in the installation of the fiber optic cable or conduit 8. The first guide trough 38 and the corner 40 shield are preferably coated with a low friction polymer coating such as TEFLON.

A removable packing gland 50 is engaged to and seals with the entry gland 22. The removable packing gland 50 includes a bore 52 connecting to the bore 24 of the entry gland 22. The removable packing gland 50 also includes a recess 54 for holding packing seal 28 such as TEFLON or VITON. A guide duct 56 is preferably located on an end of the removable packing gland 50 to aid in guiding the duct rod 70 through removable packing gland 50.

Still referring to FIG. 2, a first driving mechanism or rod driver 60 is located relatively near the first drilling fitting 18 and the first air lock housing 30. The first rod driver 60 provides the moving force to push and pull the duct rod 70 through the pressurized gas pipeline 10. Preferably, the first rod driver 60 is a commercial tractor feeder. The first rod driver 60 engages or grips the duct rod 70. The duct rod 70 is preferably made from a glass-reinforced composite polymer that is typically used as a snake for cable pulling. The duct rod 70 advantageously includes a polymer coating such as TEFLON or the like to aid in pushing and pulling through the pressurized gas pipeline 10. The duct rod can be any of those commercially available with a diameter that fits the dimensions of the removable packing gland 50, typically 10–12 mm OD.

Test results show that steel duct rod works well in plastic pipelines, and fiberglass duct rod works well in steel pipelines. However, fiberglass duct rod may not be stiff enough for use over long distances. Steel duct rod coated with a low friction material, such as a polymer, is preferred for use in metal or steel pipelines, especially over long distances. The duct rod may be installed and routed using a tractor feeder, which can push or pull the duct rod. Alternatively, a power rod feeder, which can push, pull, and simultaneously turn or rotate the duct rod, may be used.

FIG. 2 also shows the guide attachment, in this case a ball 42 connected to the end of the duct rod 70. The guide attachment 42 is removably connected to the duct rod 70 during the installation process if it is too large to fit through the entry/exit glands. The guide attachment 42 helps prevent the duct rod 70 from getting stuck in the pressured gas pipeline 10 from such things as burrs, slag, and the like. The guide attachment 42 preferably has an outer diameter small enough to fit through the hole drilled in the pipeline typically about 30–60 mm. The invention can be used with small diameter or larger diameter pipelines. FIG. 2 also shows the first guide trough 38 connected to the first drilling fitting 18. The connection is made via studs 19 or other suitable mans for attaching the trough in a stable manner. The first guide trough 38 is deployed from the first air lock housing 30 and helps in the introduction and removal of the duct rod 70 and fiber optic conduit 8.

Still referring to FIG. 2, a second access or drilling fitting 80 is attached to the exterior of the pressurized gas pipeline 10, typically from about 100 to 500 meters from the first fitting. The second access or drilling fitting 80 includes a flange portion 82 and an exit gland 84. The exit gland 84 in the second drilling fitting 80 connects with the interior of the pressurized gas pipeline 10. The exit gland 84 includes a bore 86 tapered at one end for receiving split plugs 112. The exit gland 84 also includes a recess 88 for holding a packing material 28. A second completion plug 90 is shown in dotted lines in the second drilling fitting 80. The second completion plug 90 is removable from the second drilling fitting 80.

A second air lock housing 100 is mounted to the flange portion 82 of the second drilling fitting 80, preferably via bolts 102. The second air lock housing 100 also includes an interior portion or space 46 where various components and tools can be stored. A second manipulator 104 extends into the interior space 46 of the second air lock housing 100. Preferably the second manipulator 104 includes a manipulator arm that can rotate and/or extend at a wide sweep of angles from vertical within the second air lock housing 100. The second manipulator 104 is sealed against the gas pressure when the second air lock housing 100 is pressurized. The second airlock housing 100 also includes viewing ports 106 in the top and side of the second airlock housing 100. The viewing ports 106 permit an operator to visually observe the interior portion of the second air lock housing 100 and to see into the pipeline.

As shown in dotted lines in FIG. 2, the second completion plug 90, a second guide trough 108, a corner shield 110, a guide ball 42, and tapered split plugs 112 are stored inside the second air lock housing 100. These items are moveable/installable within the second air lock housing 100 via the second manipulator 104.

A second removable packing gland 114 is engaged to and sealed with the exit gland 84. The second removable packing gland 114 includes a bore 116 connecting with the bore 86 of the exit gland 84. The second removable packing gland 114 also includes a recess 118 for holding packing material 28.

Referring now to FIG. 3, a second rod driver 124 is positioned near the second drilling fitting 80 and the second air lock housing 100. The second driving mechanism 124 feeds the fiber optic cable or conduit 8 into the pressurized gas pipeline 10 via the second removable packing gland 114. Preferably, the second driving mechanism 124 is a commercial tractor feeder. A guide duct 120 is advantageously located on an end of the second removable packing gland 114 to aid in guiding fiber optic conduit 8 through the second removable packing gland 114. Both rod drivers can push or pull the rod, fiber optic cable or conduit as required.

Referring back to FIG. 2, the second guide trough 108 is shown in its deployed configuration, wherein the second guide trough 108 is positioned by attaching to pipeline 10 or second drilling fitting 80 via studs 92 or another suitable mechanism. The second guide trough 108 aids in the removing and installing the duct rod 70 and fiber optic cable or conduit 8 into the pressurized gas pipeline 10. A cross-sectional view of the second guide trough 108 is shown in FIG. 4. The second guide through 108 is preferably coated with a low friction polymer coating such as TEFLON. As shown in FIG. 2, a second corner shield 110 is also shown in the deployed state. The second corner shield 110 helps prevent the duct rod 70 and fiber optic cable or conduit 8 from getting stuck or being abraded or cut during installation. Preferably, the second corner shield 110 is also coated with a low friction polymer such as TEFLON. Teflon coating the guide trough and corner shields reduces drag when installing cable, conduit or rod.

The guide troughs support the cable, conduit or rod to prevent kinks at the infeed end. They centralize and guide the cable, conduit or rod on the outfeed end. The corner shields protect the cable, conduit, or rod from abrasion and gouging caused by the rough machined edges of the drilled holes.

With reference to FIGS. 2 and 3, showing the system installed, in an overview of the method of introducing the fiber optic conduit 8 into the pressurized gas pipeline 10, generally the duct rod 70 is initially introduced into the pressurized gas pipeline 10 via an entry port in the first access or drilling fitting 18. The entry port preferably extends through the gland 22 and the first removable packing gland 50. However, the entry port can also include just the entry gland 22.

After the corner shields and troughs (if used) are deployed within the first air lock housing 30, the duct rod 70 is advanced through the pressurized gas pipeline 10. Corner shields and troughs are optionally also deployed and removed in the second air lock housing 100. The duct rod 70 then exits the pressurized gas pipeline 10 via an exit port in the second drilling fitting 80. The exit port preferably includes the exit gland 84 and the second removable packing gland 114. However, the exit port can include just the exit gland 84. A fiber optic cable or conduit 8 is then attached to the end of the duct rod 70. The duct rod 70 and the fiber optic conduit 8 are then pulled back through and out of the pressurized gas pipeline 10. The duct rod is preferably rewound onto a spool for reuse at the next segment of pipeline. The conduit can be joined to the next adjacent segment of conduit or left open for customer connection once a fiber optic cable is installed within the conduit using conventional installation techniques. With conduit installed and sealed at both ends, cable can be installed at a later date when convenient.

Turning now in detail to the system and methods of the invention, the installation begins by attaching (e.g., welding) the first drilling fitting 18 to the pressurized gas pipeline 10. The first removable packing gland 50 is installed in the entry gland 22. The leading end of the duct rod 70 is then inserted into the first removable packing gland 50 and the entry gland 22 to aid in sealing off pressurized gas. A drilling machine designed for drilling operations under gas pressure, such as a Mueller C-136, E-5 or similar drilling machine, is attached, e.g., bolted and sealed onto the drilling fitting. The pressurized gas pipeline 10 is then drilled via a drilling or cutting machine 251 (shown installed in FIG. 6). This drilling is preferably done at right angle to the pipeline. The slug is removed from the pressurized gas pipeline 10 and the first drilling fitting 18 is sealed with the first completion plug 26. The first air lock housing 30 is then mounted to the first drilling fitting 18 via bolts 32. Use of drilling fittings and drilling machines on pressurized pipelines is well known. Other commonly known techniques for creating an opening into the pipeline may also be used.

Using the viewing ports 36, an operator then uses the first manipulator 34 to substantially equalized the pressure in the first air lock housing 30 with the pressurized gas pipeline 10. The first completion plug 26 is removed and stored within the first air lock housing 30 via the manipulator 34. Next, the first guide trough 38 is deployed using the first manipulator 34. The first guide trough 38 is mounted to the studs 19. The end of the duct rod 70 is slowly fed into the fitting 18. The guide ball 42 is attached on the end of the duct rod 70 via the first manipulator 34. The guide ball 42 and the duct rod 70 are then pushed down the first guide trough 38 and through the pressurized gas pipeline 10. The first driving mechanism 60 provides the force needed to push the duct rod 70 and guide ball 42 along the pressurized gas pipeline 10. A dry lubricant may be added to the exterior of the duct rod 70 before it enters gland 50. Gas leakage is minimized by the glands and seals.

The second air lock housing 100 is installed in a similar manner as described above for the first air lock housing 30. The second drilling fitting 80 is attached to the pressurized gas pipeline 10. The second removable packing gland 114 is installed in the exit gland 84. A short piece of duct rod 70 is then inserted into the second removable packing gland 114 and secured to aid in sealing off the pressurized gas. The pressurized gas pipeline 10 is then drilled or otherwise opened up within the second drilling fitting 80. The slug is removed from the pressurized gas pipeline 10 and the second drilling fitting 80 is sealed with the second completion plug 90. The second air lock housing 100 is then mounted to the second drilling fitting 80 via bolts 102.

Using the viewing ports 106, an operator then uses the second manipulator 104 to substantially equalize the pressure in the second air lock housing 100 with the pressurized gas pipeline 10. The second completion plug 90 is removed and stored within the second air lock housing 100 via the manipulator 104. Next, the second guide trough 108 is deployed using the second manipulator 104. The second guide trough 108 is mounted on studs 92. The second air lock housing 100 can be installed on the pressurized gas pipeline 10 either before, after, or during the installation of the first air lock housing 30.

The shape of the second guide trough 108, as shown, for example in FIG. 4, leads the advancing guide ball 42 and duct rod 70 into the second drilling fitting 80. The first guide trough 38 may also have this same profile. When the guide attachment 42 is part way up the second guide trough 108, the operator uses the second manipulator 104 to remove the guide attachment 42 and store the guide attachment 42 in the second air lock housing 100. The end of the duct rod 70 is then slowly advanced into the exit gland 84, if necessary with the help of the second manipulator arms, and pushes out the short piece of duct rod 70 that was sealing the second removable packing gland 114. Split plugs 44, 112 can be inserted from the inside of the first and second drilling fittings 18, 80 via the first and second manipulators 34, 104 to seal the system while the glands are arranged to pull the duct rod 70 and/or fiber optic conduit 8 through the pressurized gas pipeline 10.

With the duct rod 70 now pushed outside the exit gland 84, the fiber optic cable or conduit 8 is connected to the end of the duct rod 70, preferably via a cable grip 126 attached to the end of the duct rod 70. Once the duct rod 70 and the cable grip 126 are connected, the split plugs 112 are removed via the second manipulator 104. The first driving mechanism 60 then reverses direction and begins to pull the duct rod 70 and fiber optic conduit 8 back through the pressurized gas pipeline 10. At the same time, the second driving mechanism 124 feeds the fiber optic conduit 8 into the guide duct 120. The duct rod 70 is pulled at the same speed that the fiber optic conduit 8 is fed into the pressurized gas pipeline 10. A lubricant may be added to the exterior of the fiber optic conduit 8.

Alternatively, the duct rod at the entry can be pulled through to the end of its roll, and the fiber optic cable or conduit attached at the entry and pulled through the pipe from that point to the exit location. This approach allows the rod to be coiled at the exit location and be closely located to the next pipeline segment entry location. This facilitates multiple segment installations.

The first removable packing gland 50 is then sized to permit passage of the cable grip 126 such that the entry gland 22 (which will now be used as an exit gland since the duct rod 70 and fiber optic conduit 8 are being pulled in the opposing direction) can seal on the exterior of the cable grip 126 and fiber optic conduit 8. The duct rod 70 and fiber optic conduit 8 are then pulled out the first drilling fitting 18 into a final position. Once the duct rod 70 and fiber optic conduit 8 are in the final position, the tapered split plugs 44, 112 are placed into position using the first and second manipulators 34, 104. The first and second removable packing glands 50, 114 are then removed along with any packing material 28 and final split plug seals are installed.

The entry gland 22 and the exit gland seals 84 are finally secured and further sealed via a threaded nut 352 and service head adapter with shield nut 360 (shown in FIG. 15 and described below). The first completion plug 26 and the second completion plug 90 are retrieved and installed in the first and the second drilling fittings 18, 80 using the first and second manipulators 34, 104, respectively. The pressure is reduced in the first air lock housing 30 and second air lock housing 100 and the first and second air lock housings 30, 100 are removed from their respective flanges 20, 82.

The fiber optic conduit 8 containing fiber optic cable is now installed in the pressurized gas pipeline 10. The method and device are capable of installing fiber optic conduit 8 into pressurized gas pipelines 10 without stopping or impeding the flow of natural gas. In this manner, existing pressurized gas pipelines 10 can be installed with fiber optic conduit 8 without disruption in gas service to customers.

Figure 5:
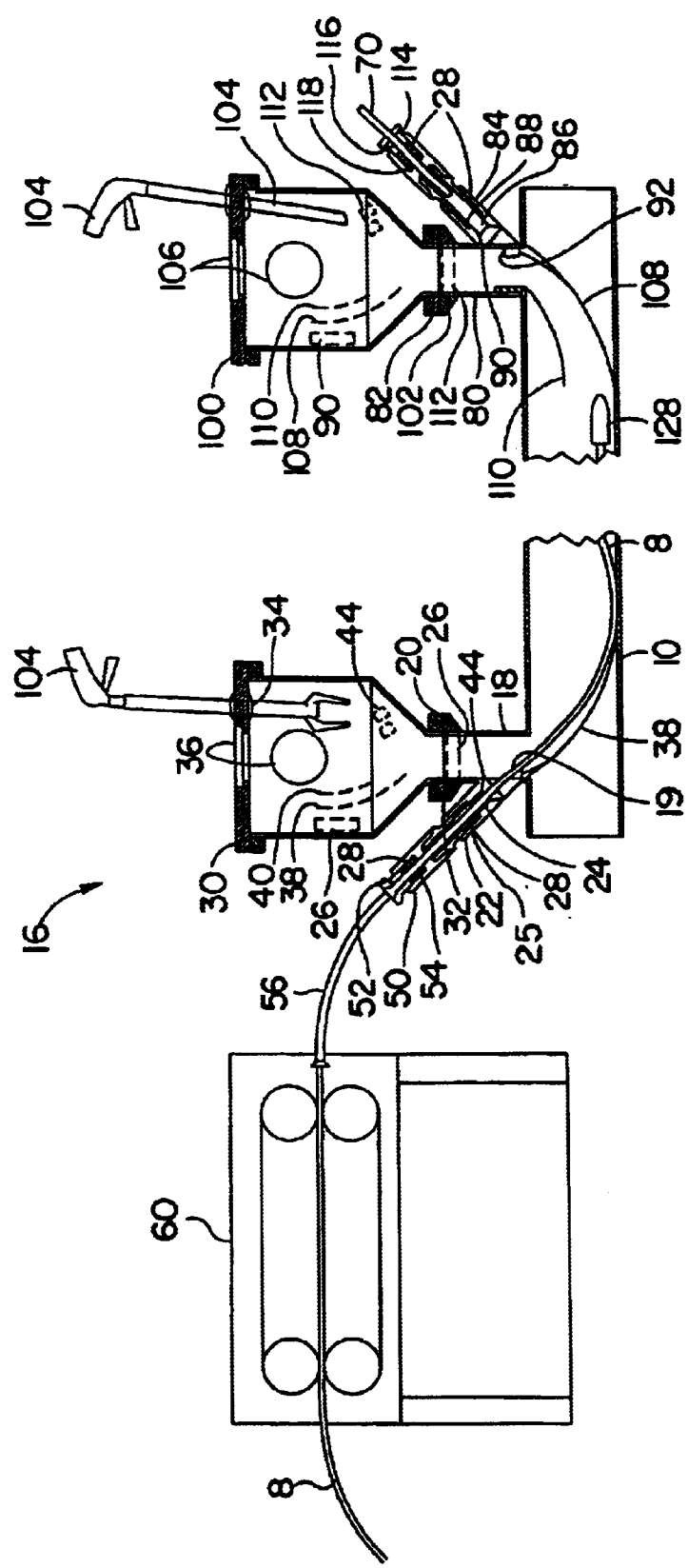
FIG. 5 is a side view of the installation device according to alternative embodiment of the invention.

In an alternative embodiment of the invention, shown in FIG. 5, the duct rod 70 is replaced with semi-rigid fiber optic or other conduit 8. A bull nose or bullet head 128 may be located on the end of the conduit 8 and allows the fiber optic conduit 8 to be pushed through the glands 22, 84 and pressurized gas pipeline 10 without the need for a separate duct rod 70 or for a rodding gland assembly 50, 118. As with the prior method, the drilling fittings 18, 80 and the first and second air lock housings 30, 100 would also be employed. The guide attachment 42, however, would not be needed. In this aspect of the invention, the fiber optic conduit 8 needs to be sufficiently rigid to permit the snaking of the fiber optic conduit 8 through the pressurized gas pipeline 10 for distances anticipated to be found between customer connection locations in urban environments. For example, the fiber optic conduit 8 can include one or more reinforcing layers wrapped around a central core conduit or, a duct rod can be inserted into the conduit. Alternatively, the fiber optic conduit 8 can be made of a composite polymer that has sufficient rigidity such that the fiber optic conduit 8 can be snaked through the pressurized gas pipeline 10. Pressurizing the conduit with compressed gas is another option for increasing the conduit rigidity.

Figure 6:
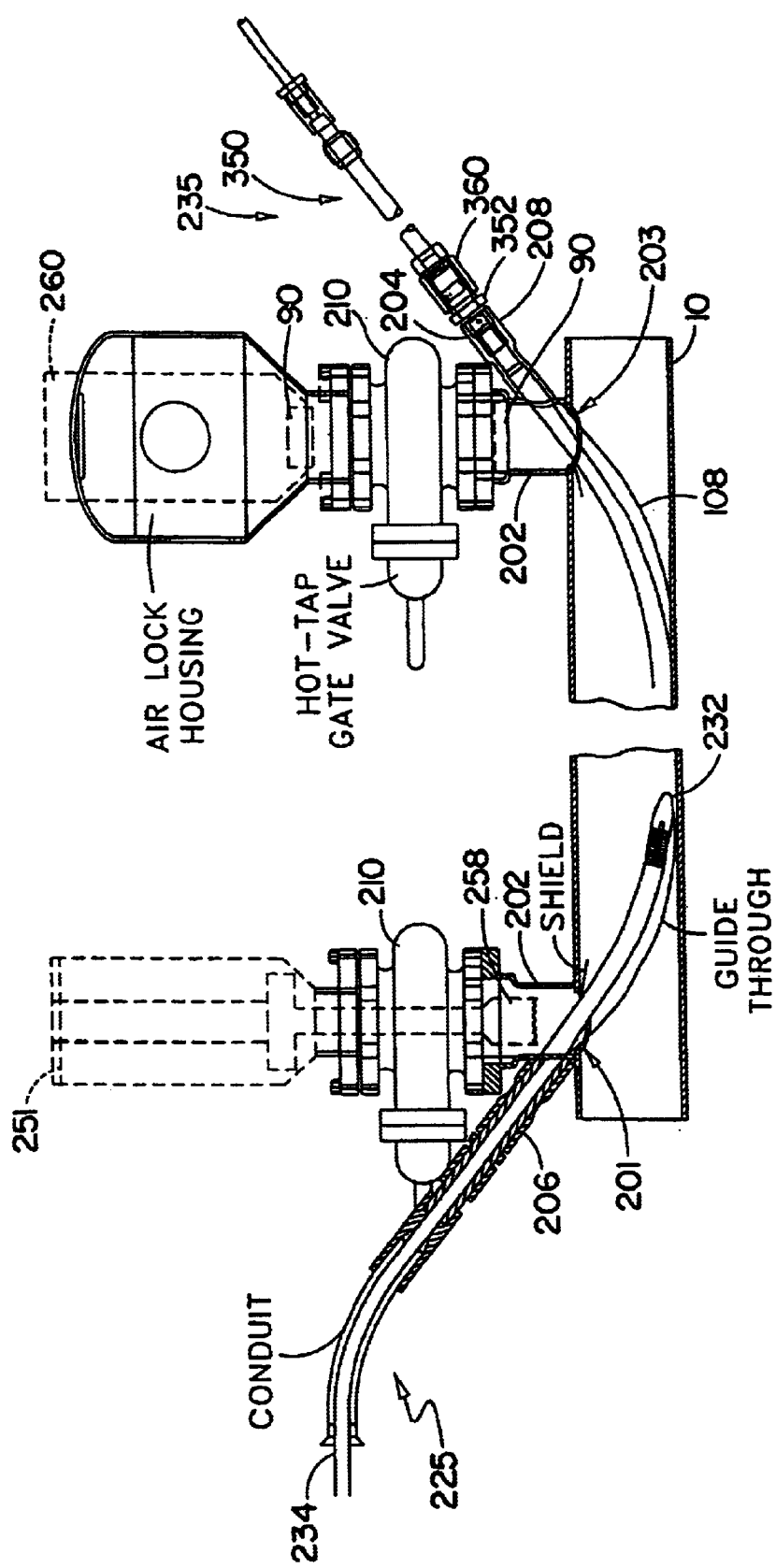
FIG. 6 is a schematic view of an another alternative system and method for installing conduit directly.

Referring now to FIG. 6, in an alternative system and method, standard "hot-tap" drilling fittings or line stopper fittings 202 are modified with a side arm 204 containing packing glands 208 at their outer ends. The fittings 202 are located in position on the gas pipeline 10 and welded in place. In plastic pipe, the plastic access fitting is fused to the pipe using conventional techniques such as electrofusion or heat fusion. A gate valve 210 and drilling machine 251 are attached to the drilling fitting 202. The valve 210 is opened. The drilling machine 251 extends a cutter 253 through the open valve and cuts a hole in the pipeline, within the drilling fitting 202. The cutter 253 is withdrawn back out through the open valve, and the valve is then closed. The drilling machine 251 is then removed (e.g., unbolted) leaving the gate valve in place. The air lock housing 30 is attached to the gate valve and the valve opened, giving access to the pipe through the air lock housing 30.

After the fiber optic cable or conduit installation is complete, the gate valve is closed, the air lock housing removed and a completion or stopping machine 260, such as a Mueller H-17235, E-5 or equivalent, is attached and sealed onto the drilling fitting, preferably via bolts. The completion machine 260 holds the completion plug 26 or 90. The valve is opened and the completion plug 26 or 90 is installed into the upright neck of the drilling fitting and tightened using the completion machine 260. The completion machine 260 and gate valve are removed and a blind flange or threaded cap is installed over the access fitting.

Figure 7:
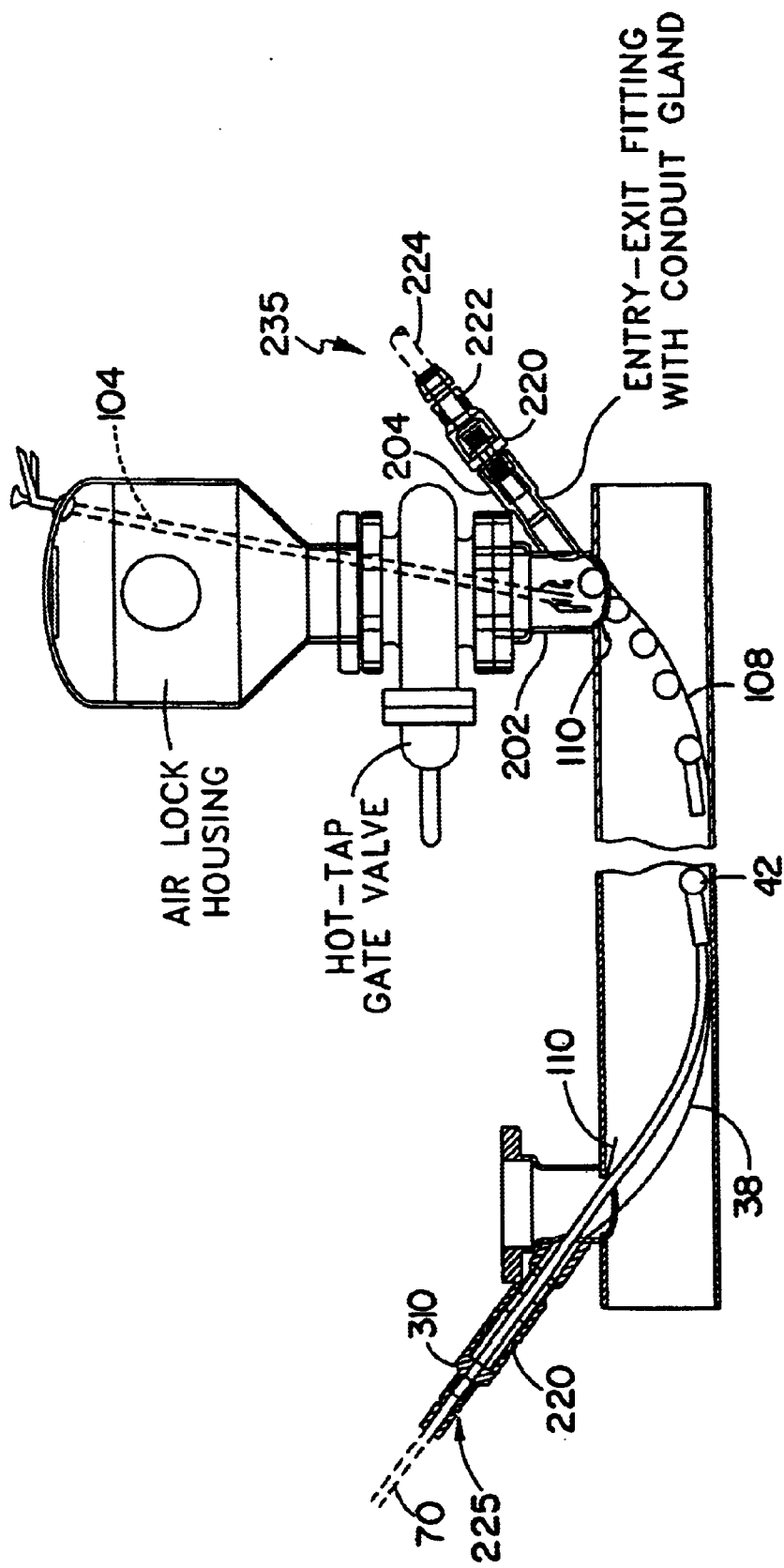
FIG. 7 is a schematic view of another method and system using a guide rod to pull cable or conduit back through a pipeline.

Referring to FIG. 7, when duct rodding is used, the following steps are preferably performed (although each step is not necessarily essential):

1. Before drilling the hole in the pipeline, conduit gland nut 222 or 352 and a rodding adapter gland nut 222 are attached to the entry/exit fitting 204 on the drilling fitting 202. On the infeed end 225, the rod 70 is inserted through the glands, and the rod guide attachment 42 is attached to the rod 70. The rod attachment is retracted into the recess at the inner end of the entry/exit fitting if its size detrimentally blocks the pipe entry hole 203. On the outfeed end 235, a short length of rod 224 is inserted into the rodding adapter 222 to act as a temporary plug.
2. Holes are cut in the pipeline. The air lock housings are attached as explained above.
3. Using the manipulator 34, 104, the guide troughs 38, 108 and corner shields 110 are installed from inside the air lock housings.
4. The rod 70 is pushed until the guide attachment 42 is at the top of the trough 108 at the outlet end 235. Alternatively, if no guide trough is used, the manipulator arms can be used to grasp the guide rod and maneuver it into the exit gland. Using the manipulator 104, the guide ball is removed and the rod is guided into the entry/exit fitting 204. Alternatively, the duct rod 70 is attached to the short piece of duct rod that was pre-installed in the exit gland. Once attached, the pre-installed rod piece 224 can be used to pull the duct rod 70 through the exit. In some applications, the duct rod or conduit may be snaked or driven through by hand, especially on shorter runs.
5. The rod is pushed through the glands, pushing out the plug 224.
6. By attaching a fiber optic or other type cable or a conduit to either end of the rod, installation can proceed with forward or backward direction by pushing and/or pulling the duct rod.
7. Split rubber plugs can be installed in the recesses at the inner ends of the entry/exit fittings using the manipulator to control leaking until the proper seal packing is installed in the glands.
8. Completion plugs area installed. The air lock housings and valves are removed, as explained above.

Figure 8:
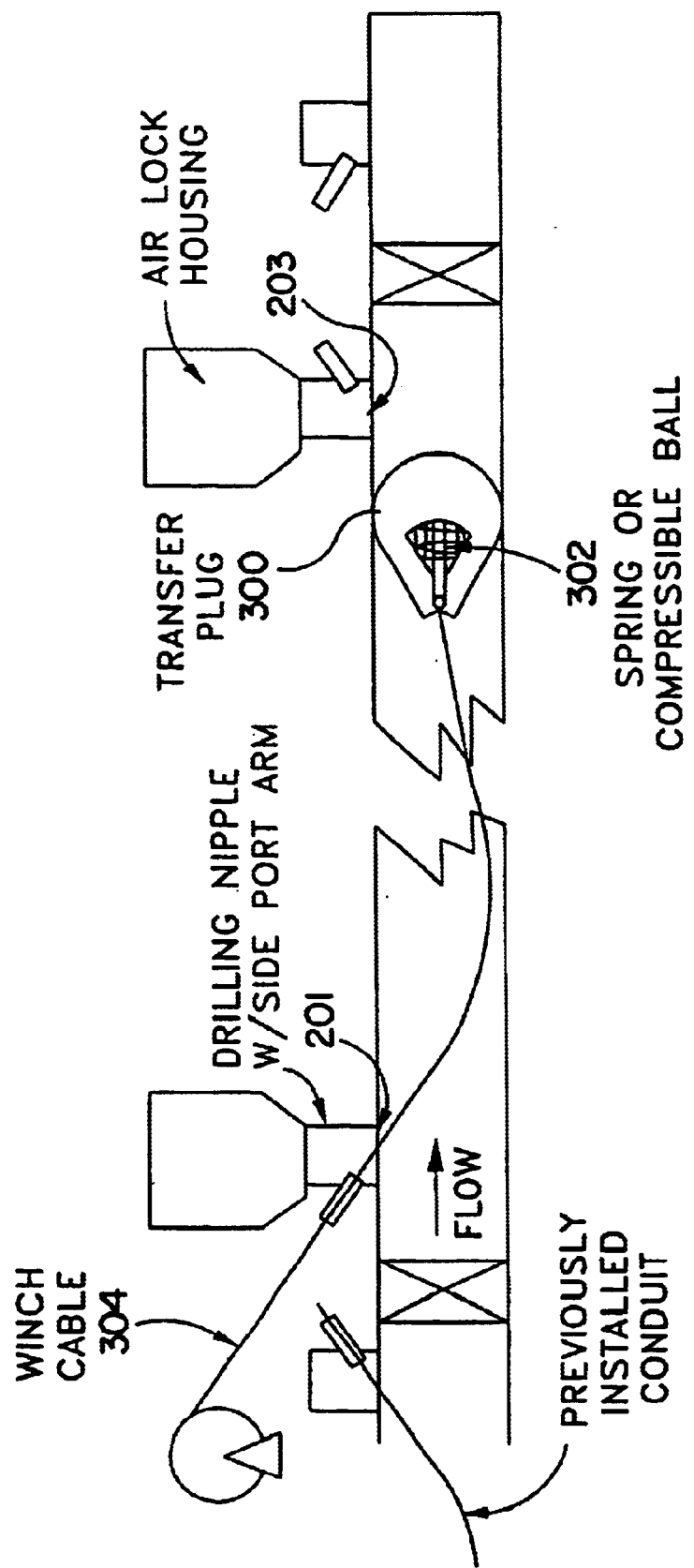
FIG. 8 is a schematic diagram of a transfer plug embodiment.

In place of the driving apparatus 60 and 124, in an alternative design shown in FIG. 8, a transfer plug 300 is installed into and removed from the pipeline via the air lock housings. The transfer plug 300 has a spring-like frame 302 which causes it to pop open after it is pushed through the entrance hole 201 cut into the pipeline. Alternatively, the transfer plug can be constructed with a solid, compressible core with a "memory" shape similar to the pipeline cross section. Preferably, the parachute has a diameter just slightly less than the pipeline diameter. A draw cable, rope, or wire 304 is attached to the transfer plug 300. The gas flowing through the pipe carries or blows the parachute 300 from the first drilling fitting to the second drilling fitting, where it is extracted through the exit hole 203, using the manipulator. The draw cable 304 is separated from the transfer plug and is pulled through the exit glands using an extractor hook on the end of a piece of duct rod 70. The back end of the draw wire 304 is attached to a cable or conduit. By pulling on the draw wire 304, the cable or conduit is pulled through the pipeline. Hence no duct rod is needed to route the conduit through the pipeline in this embodiment. In certain applications, compressed gas, such as nitrogen or air, may be used to blow the transfer plug 300 through the pipeline, instead of the gas. In routing or passing conduit through the pipeline, the conduit may be stiffened, by filling it with compressed gas, or by placing a stiffening element or material in the conduit. The stiffened conduit is easier to route.

FIGS. 9–12 show an alternative design having an end plug 250 having grip rings 252 which secure it into the open end of a conduit 254. The end plug 250 preferably also has a spherical end nose 256, a coupler groove 258, a conical guide collar 260, and a neck 262, as shown in FIG. 13. A manipulator 270 on a fitting 271 attached to the pipeline has a hand 272 adapted to close around the neck 262. The hand 272 is supported on an armature 274 attached to the lower end of the manipulator 270 at a pivot joint 276. A linkage 278 on the armature 274 extends up through or near the armature 274, so that the hand 272 can be pivoted up at an angle, as shown in FIG. 12, by controlling the manipulator handles, outside of the air lock.

Referring now also to FIGS. 13 and 14, a coupler 300 is positioned into a neck 302 of the fitting 271. The coupler has a receptacle 304 adapted to couple onto the end plug 250. The receptacle has ball bearings 306 engaging a groove in the receptable. The receptacle has a conical guide 308 adapted to cooperate with the guide collar 260, to guide the groove 258 into engagement with the ball bearings 306. The receptacle 304 is slidably positioned within a collar 310. An insert 312 within the receptacle is biased forward by a spring 313. A further description of the coupler 300 is provided below with reference to FIG. 14.

In use, the end plug 250 is maneuvered into position under the manipulator 270. The neck 262 is grabbed by the hand 272, as shown in FIG. 10. Using the linkage 278, the end plug 250 and attached conduit is tilted up into alignment with the coupler 300 in the neck 302. The collar 310 and receptacle 304 is pushed into engagement with the end plug 250. The ball bearings 306 move into the groove as the insert 312 moves back against the spring force. The end plug 250 and attached conduit can then be pulled out of the neck 302 by pulling on the extractor segment.

Figures 18, 19:
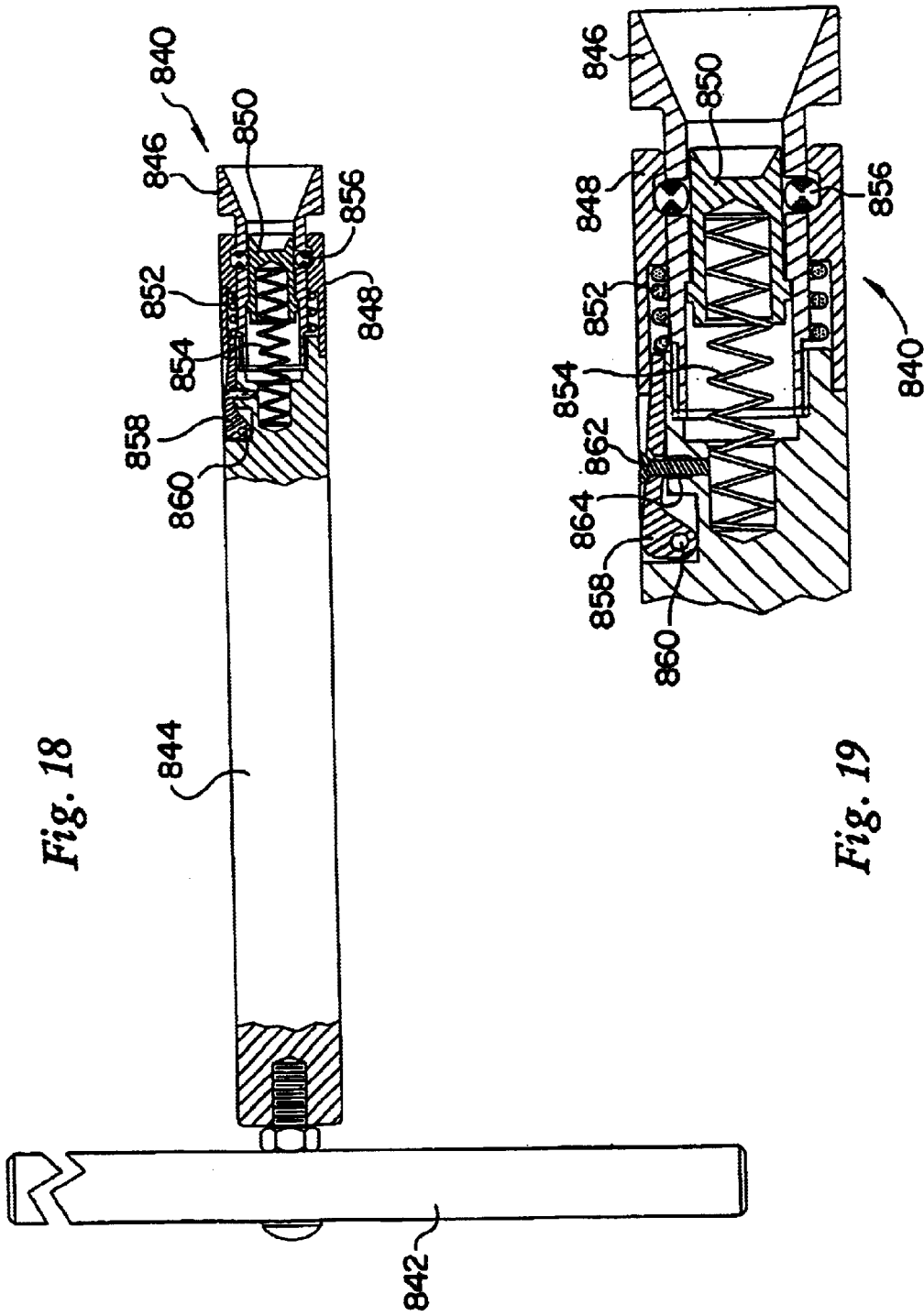
FIG. 18 is a side view in part section of another extraction tool for use with conduit.
FIG. 19 is an enlarged section view of the front end of the tool shown in FIG. 18.

Referring to FIGS. 6 and 9–14, if conduit is to be installed directly, the following steps are preferably performed (although each step is not necessarily essential):

1. Before drilling the hole in the pipeline, the conduit gland nut 220 is attached to the entry/exit fitting. The conduit nose fitting 250 is installed on the end of the conduit 254 and pushed into the conduit gland to seal it. A coupler 300, as shown in FIGS. 9 and 13, is inserted into the exit port gland 204 and gland nut 220, shown in FIG. 6.
2. The valve is attached, the hole is drilled in the pipeline, and the air lock housing is attached as explained above.
3. Using the manipulator 270, the corner shields 400 are installed into the pipeline from inside the air lock housing, as shown in FIG. 19.
4. The conduit 254 is pushed through until the nose fitting 250 is reachable by manipulator arm 270 at the exit end 235. The manipulator 270 is used to attach the nose fitting 250 to the coupler 300. FIG. 9 shows detailed examples of the manipulator, nose fitting and coupler fittings and how they function as a system.
5. The coupler 300 is used to pull the conduit 254 through the exit gland 204 and gland nut 220.
6. A completion plug is installed. The air lock housing and valves are removed as explained above.
7. The conduit 234 is now sealed to the pipeline 10 using a modified service head adapter with shield nut 360, but the interior of the conduit is still open. After the cable is installed in the conduit, it is preferably sealed to the conduit, either at the entry/exit fitting or at a remote end of the conduit. An assembly of appropriate glands will provide the seal in either case.

The guide troughs, guide ball, and corner shields may be omitted or replaced with functional equivalents.

While the system is preferably used on pipelines of about 5 cm or larger, it may also be used on smaller lines, with modified access fittings.

The system and methods may also be used with other types of pressurized pipelines, including pipelines carrying liquids, with appropriate modifications of the seals and glands.

The duct rod or conduit (with or without stiffening devices) acts as a translating member, i.e., an element that is moved through the pipeline.

Nominal gas leakage may of course occur in using the present system and methods, without affecting the advantageous results. The description herein of sealing, seals, pressure tightness, etc. and steps performed without allowing gas to escape, of course contemplate and include situations where nominal leakage occurs.

If suitably strong manipulators are used, the gate valve is not needed and the air lock housing can be mounted directly to the drilling fitting, as shown in FIGS. 2 and 3. After equalizing pressure, the completion plug could be removed with the manipulator and stored inside the air lock housing.

The attachment of components described above are made pressure-tight, to prevent gas from escaping form the pipeline, using known seals, components and methods, except as specified.

An alternative extractor system 750 for removing a nosepiece from a pipeline is shown in FIG. 15. The extractor system 750 is similar to the one shown in FIGS. 9–14 and includes a receiver assembly 752 and a nose assembly 754. The nose assembly 754 preferably has a universal joint 758 attached to a duct rod 756. A heat shrink tube 760 is optionally provided around the U-joint 758. A nosepiece 762 is attached to the front section of the U-joint 758 by a setscrew 764. The nosepiece 762 is otherwise similar to the other nosepieces described above. The nosepiece 762 can pivot relative to the duct rod 756 about the first or horizontal pin 759 and the second or vertical pin 761 connecting the front and back sections of the U-joint 758.

The receiver assembly 752 has a socket 770 biased outwardly from a sleeve 774 by a compression spring 772. A plunger 778 is axially displaceable within an insert 776 secured within the sleeve 774. A plunger spring 780 urges the plunger 778 outwardly. Lock balls 784 are biased radially inwardly against the cylindrical sidewalls of the plunger 778. A barb end 782 is attached to the insert 776, for attachment to conduit 785.

In use, with reference also to FIG. 9, the receiver assembly 752 is typically held in a fixed position, e.g., in a side arm of a pressure lock fitting, as described above. The nose assembly 754 is engaged by a manipulator and moved into engagement with the receiver assembly 752. The universal joint 758 better facilitates alignment of the nosepiece 762 with the socket 770. As the nosepiece 762 moves into the socket 770, it pushes the plunger 778 back, compressing the plunger spring 780. As the groove 766 at the front end of the nosepiece 762 comes into alignment with the lock balls 784, the lock balls 784 move radially inwardly into the groove 766. This automatically locks the nosepiece 762 into the receiver assembly 752 as they are brought together. The duct rod 756 or conduit 785 may then be pushed or pulled out of the pipeline. After the extraction joint 750 is removed from the pipeline, the nosepiece 762 is released by pulling the sleeve 774 forward over the socket 770, allowing the lock balls 784 to move radially outwardly, releasing the nosepiece 762.

An alternative manual extractor tool 800 for use with conduit, as shown in FIGS. 16 and 17, includes a socket 804 within a collar 808. The collar 808 has a step section 810, and a land section 812, having a smaller diameter than the step section 810. The socket 804 is attached to a lock rod 818 extending through an extractor tube 816, via a universal joint 814. A tube handle 822 is attached to the extractor tube. A knob 820 is attached to the back end of the lock rod 818. Retainers 806 extend inwardly through radial openings in the socket 804. A latch 824 at the back end of the tool 800 latches or locks the lock rod 818 into either an engaged or disengaged position.

FIG. 16 shows the disengaged position. As shown, the retainers 806 are withdrawn or moved radially outwardly on the socket 804, with the outside ends of the retainers 806 on the step section 810. The collar 808 is seated onto the front end of the extractor tube 816. In this position, the tool 800 is ready to engage a nosepiece 826 on the leading end of a conduit 785.

The tool 800 is typically installed through a side arm, such as side arm 674 of a pressure lock housing. The seals within the side arm seal against the extractor tube 816, to prevent gas leakage. A manipulator, such as manipulator 690, manipulates the nosepiece 826 into alignment with the socket 804. The tool operator pushes the tool forward, preferably via force on the tube handle 822. The socket 804 engages the nosepiece 826. The groove 766 on the nosepiece 826 moves into alignment with the retainers 806.

To securely attach the tool 800 to the nosepiece 826, the knob 820 and lock rod 818 are pushed forward. As this occurs, the collar 808 moves forward over the socket 804. Consequently, the land area 812 of the collar 808 moves over the outside ends of the retainers 806, driving the retainers radially inwardly into the groove 766 on the nosepiece 826. The nosepiece is then securely locked together with the tool 800. The latch 824 is moved up, to prevent the knob 820 and the lock rod 818 from being inadvertently pulled back and releasing the nosepiece 826. This manual lock prevents gas pressure in the pipe from unlocking the mechanism. In contrast to the manual design shown in FIGS. 16 and 17, the other latching designs of FIGS. 9–14 and 15 are automatic.

The tool 800 and conduit 785 attached to the tool via the nosepiece 826 is pulled back out of the side arm 674, by pulling on the tube handle 822. After the tool 800 and nosepiece 826 are entirely withdrawn out of the side arm 674, the latch 824 is pushed down and the knob 820 is pulled back. This returns the tool 800 to the position shown in FIG. 16, and allows the nosepiece 826 to be released.

An alternative receiver assembly 840 for engaging and extracting a nosepiece on conduit, is shown in FIGS. 18 and 19. The receiver assembly 840 has a handle 842 attached to a pull bar 844. A socket 846 extends into sleeve 848 attached to the front end of the pull bar 844. An insert 850 within the socket 846 is biased outwardly by an insert spring 854. In the disengaged position, the insert 850 keeps lock balls 856 spaced outwardly into openings in the socket 846. A sleeve spring 852 urges the sleeve 848 outwardly over the socket 846. A pawl 858 is pivotably attached to the pull bar 848 via a pawl pivot pin 860. A pawl screw 864 extends radially inwardly through a clearance hole in the pawl 858. A pawl spring 864 around the pawl screw 862 biases the pawl 858 outwardly.

In use, as the receiver 840 is engaged with a nosepiece, the insert 850 is pushed inwardly. The lock balls 856 move into the groove in the nosepiece, via the sleeve 848 urging them inwardly. As the lock balls 856 move into the groove, and the sleeve 848 moves forward over the socket 846, the pawl 858 springs outwardly. This prevents the sleeve 848 from being pulled back, or pushed by internal pipe gas pressure and releasing the nosepiece, until the pawl 858 is pushed down.

Figure 20:
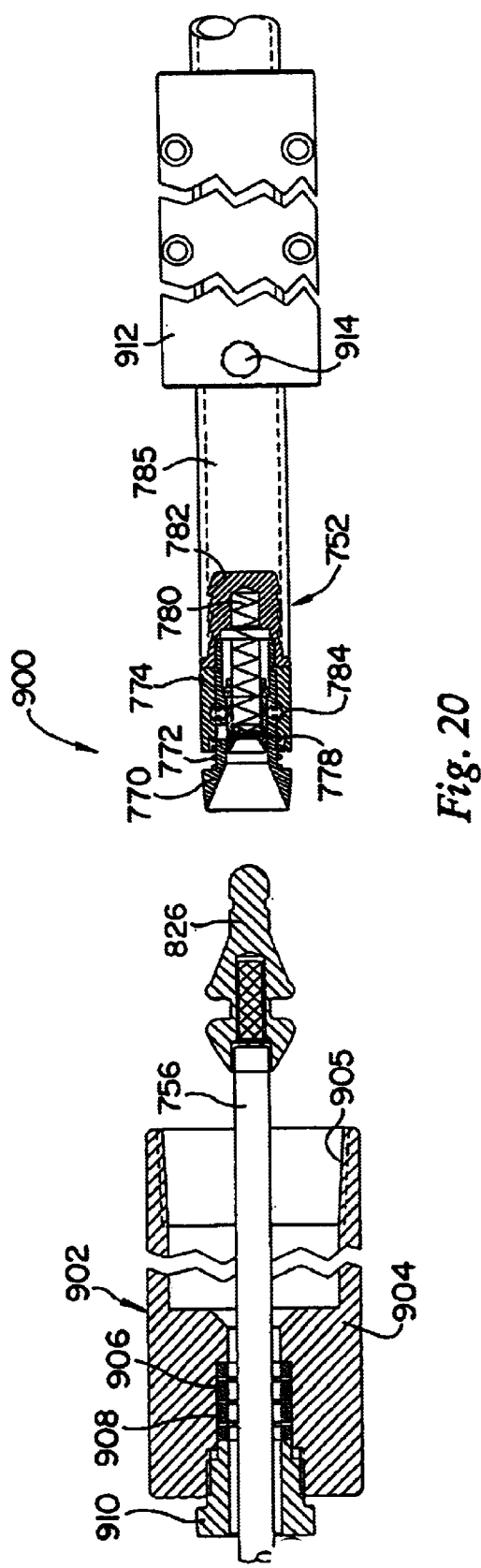
FIG. 20 is a section of another alternative extraction tool and a u-joint nose fitting for use with duct rod operations.

FIG. 20 shows an alternative extractor assembly 900 having a receiver assembly 752 as described above in connection with FIG. 15. In addition, a conduit holder clamp 12 is clamped around the conduit 785 via fasteners. A handle 914 extends outwardly from each side of the clamp 912. The handles 914 are used for moving the receiver assembly through the seals in the pressure lock housing.

Referring still to FIG. 20, duct rod 756 is attached to a nosepiece 826. The duct rod 756 extends through a rod gland assembly 902, which is installed onto the duct rod before the duct rod is attached to the nosepiece (e.g., via adhesives or screw threads). The rod gland assembly 902 includes packings 906 and washers 908 within a gland body 904. A gland nut 910 holds the packings 906 and washers 908 in place.

In use, before an access opening is drilled or cut into the pipeline, the rod gland assembly 902 is threaded onto a pipeline access fitting, such as a side arm of an air lock housing, preferably via pipe or screw threads 905 at the front end of the gland body 904. The gland nut 910 is tightened sufficiently to seal around the duct rod, to minimize or avoid gas leakage, while still allowing the duct rod to be pushed or pulled through the rod gland assembly. With the rod gland assembly in place, a hole is drilled or cut into the pipeline, as described above. The packings 906 provide a seal around the duct rod. The duct rod is then routed through the pipeline as described above.

In this method, the nosepiece is already in the air lock housing or other fitting, before the opening is made into the pipeline. Consequently, the need to exert a large force on the duct rod, either manually or with a rod driver 60, to overcome the force of the gas pressure acting on the nosepiece, is avoided. The force of the gas pressure may be substantial, depending on the pressure and the size of the nosepiece.

Referring still to FIG. 20 the nosepiece 826 and duct rod 756 are routed through the pipeline to an exit fitting. At the exit fitting, the receiver 752 is attached to the nosepiece, as described above. The duct rod 756 is then pulled back to the entry fitting. At the entry fitting, the conduit, which has a larger diameter than the duct rod 756, is pulled through seals in the entry fitting. The pipeline is then sealed at the entry fitting via the outside surface of the conduit in sealing engagement with seals in the entry fitting. The rod gland assembly 902 can then be removed from the entry fitting, as the seal provided by the packings 906 is not longer needed. With the rod gland assembly 902 removed, the duct rod 756 and the nosepiece 826 attached to the receiver 752 are pulled back out of the exit fitting. The nosepiece 826 is then released from the receiver 752 by pulling the sleeve 774 forward.

Figures 23, 24, 25:
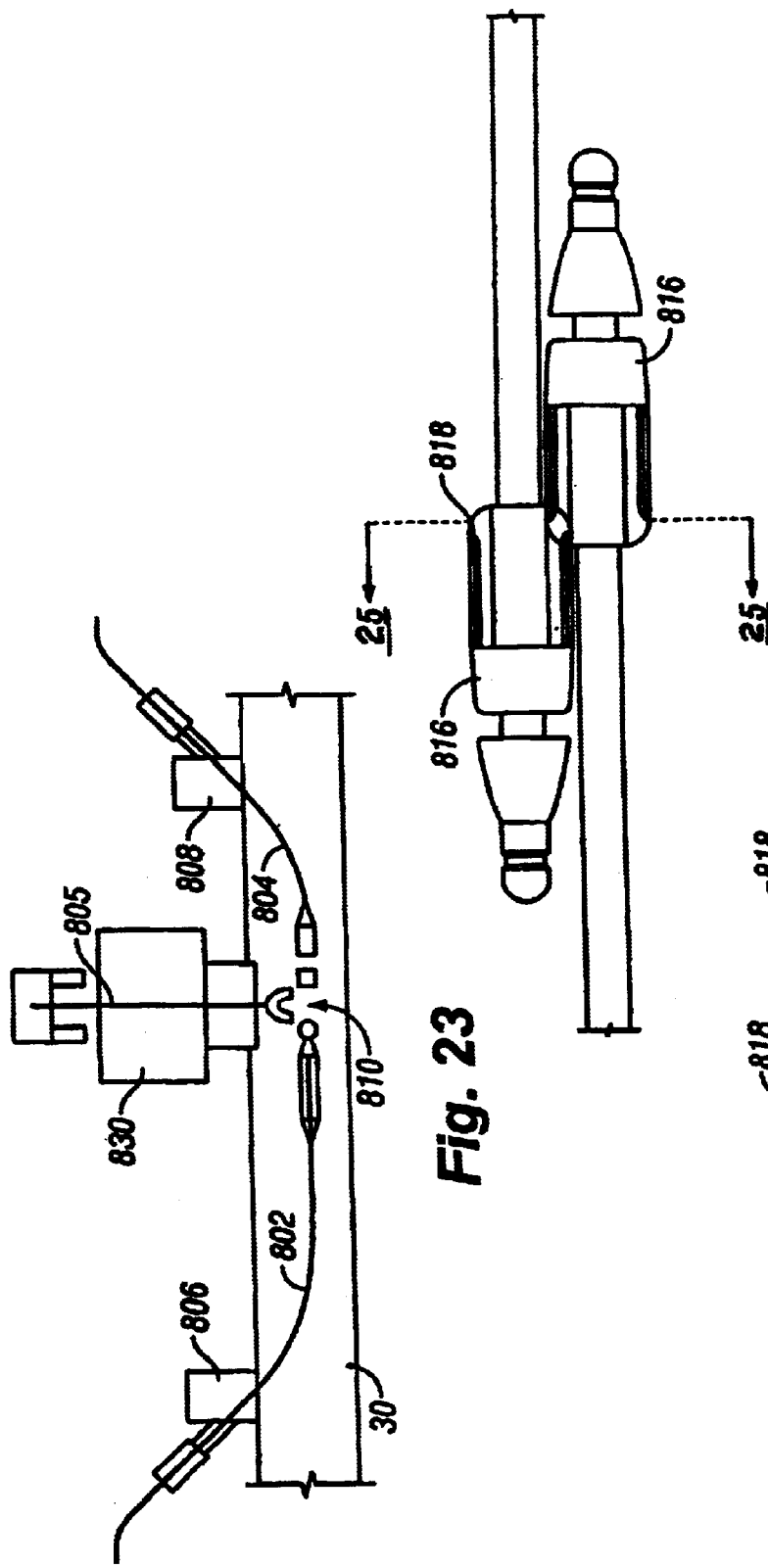
FIG. 23 is a schematic diagram of a third embodiment of a mid-pipeline connection conduit installation.
FIG. 24 is a side view of the self joining duct rod ends shown in FIG. 22.
FIG. 25 is a section view taken along line 25—25 of FIG. 24.

FIGS. 21–23 schematically show mid-pipeline connection methods. First and second translating members 802 and 804, such as a duct rods or conduits, are routed towards each other within the pipeline from first and second entry points 806 and 808. The translating members have end fittings 812 and 814 designed to engage and hold onto each other. In the embodiment shown in FIG. 22, the end fittings 812 and 814 are grappling fittings 816 having rear facing flanges or fingers 818.

As shown in FIGS. 24 and 25, the end fittings are moved past each other at a mid point 810 in the pipeline. The translating members are then pulled back. The flanges 818 then engage into each other. The first translating member is then pulled back to the first entry point, pulling the second translating member with it. The second translating member is optionally pushed as well. The first and second translating members can then be used to route a cable or conduit through the pipeline from the first entry to and out of the second entry point, using the methods and apparatus described above. This mid point connection method effectively doubles the length of pipeline that can be traversed using duct rod, in contrast to pushing duct rod from one end only. Of course, the mid point where the translating member meet and join each other within the pipeline may be at virtually any location between the first and second entry points. However, typically, if the first and second translating members have similar push through distance limits, the mid point will be about equally distant from the first and second entry points.

By measuring the length of translating member or duct rod pushed or paid out (which many pushing machines 60 can automatically do), the machine operators know the positions of the end fittings within the pipeline. When the end fittings are approaching each other, their movement can be slowed down. Depending on the type of end fittings used, they can be pushed towards or past each other, and optionally then slowly pulled back, until they engage or lock together. An increase in the force needed to pull back one translating member indicates a positive engagement, as the machine 60 pulling back is now pulling twice the length of e.g., duct rod. Generally, to perform the actual engagement of the end fittings, one end fitting is stopped and remains still within the pipeline. The other end fitting is then advanced, to engage with the stationary end fitting.

Figure 26:
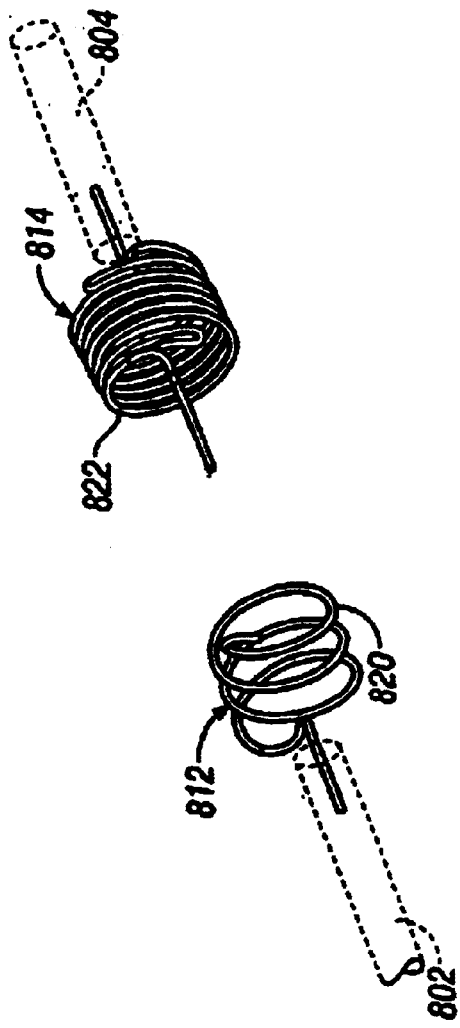
FIG. 26 is a perspective view of alternative design self joining duct rod ends.

The end fittings 812 and 814 can have various designs, so long as they can engage and hold each other against the pull back force needed to extract the translating members from the pipeline. Various latching, hooking, catching, winding, adhering, etc. techniques may be used. As shown in FIG. 21, the end fittings 812 and 814 may include an end nose fitting and a socket fitting, similar to those shown in FIGS. 9–15. Alternatively, the translating member fittings can combine together various latching mechanisms that increase the chances of a successful coupling. For example, as shown in FIG. 22, the fittings can be constructed with a nose and socket fitting design, as shown in FIGS. 9–15, as well integrated as latching mechanisms as shown in FIG. 25. This dual design provides two mechanisms or modes of attachment, thus increasing the likelihood of a successful coupling. As shown in FIG. 26, the end fittings 812 and 814 may include coil elements 820 and 822. Turning the translating members as they advance (which some duct rod drivers can automatically do) causes the coil elements 820 to engage and lock into each other. Either translating member can them be pulled back to its entry point to complete the cable or conduit installation process.

The mid-pipe coupling methods can be achieved typically without manual manipulation at the point of connection. The latching or nose socket mechanisms are designed to couple the translating members when they are pulled past each other in close proximity or pushed together head-on, respectively.

Figure 27:
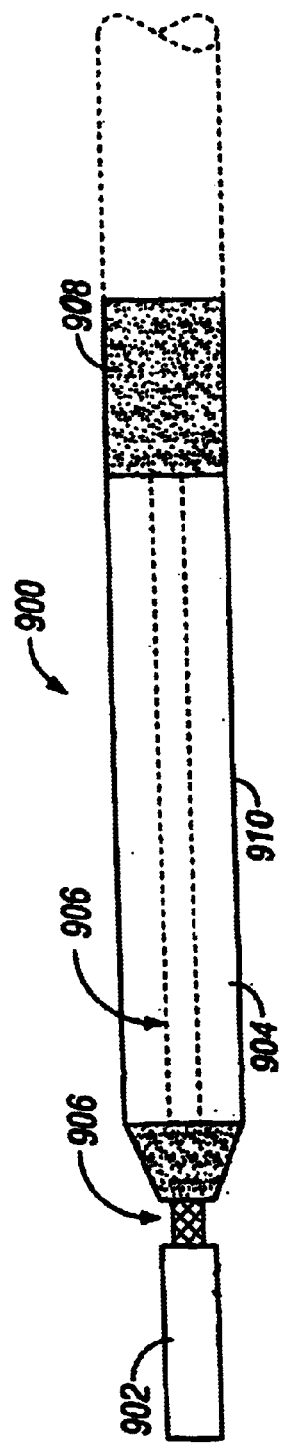
FIG. 27 is a schematic illustration of a coupler leader for use in performing methods similar to those shown in FIG. 21.

As shown in FIG. 27, a coupling leader 900 has a rigid front end fitting or rod 902 attached to a coupling body 904 by a flexible link, such as a cable or wire 906. The flexible link 906 may extend into and through the coupling body 904, to a rear fitting 908. The coupling body 904 has a covering 910 to provide rigidity, and to also provide a cylindrical surface to seal against during insertion/extraction through seal fittings into a pressurized pipeline. The rear fitting 908 attaches to a translating member, such as a duct rod. The coupling leader 900 may be used in front of the types fittings shown in FIGS. 24–26, to better facilitate alignment and engagement of translating members in performing mid-point connection methods. Alternatively, the coupling leader 900 can be used alone at the leading end of one translating member, with the other translating member having a similar leader, but having a receptacle to receive and couple with the front end fitting 902.

In use, the coupling leader 900 tends to align itself on the pipe axis at the pipe bottom as the translating member is pushed or pulled through the pipe. This alignment, helps to enable consistent coupling of the end fittings without manual manipulation at that point.

For certain applications, it may be useful to access the end fittings 812 and 814 at the joining point or mid point 810. As shown in FIG. 23, an air lock housing, such as housing 30 may be attached to the pipeline at the mid point. One or more manipulators such as manipulators 104 can then be used to assist in attaching the, end fittings 812 and 814 together.

Thus novel methods, components and systems have been described. Various changes and substitutions may of course be made all within the spirit and scope of the invention. The invention, therefore, should not be limited, except to the following claims and their equivalents.

What is claimed is:

1. An extractor system for extracting a duct rod, cable or conduit out of a pressurized pipeline, comprising:
   a receiver assembly and a nose assembly;
   the nose assembly attachable to the duct rod, cable or conduit, and the nose assembly including a nosepiece, with the nosepiece having at least one groove; and
   the receiver assembly operatively associated with the pipeline and including a latching mechanism for engaging into the groove and a socket for guiding the nosepiece into the latching mechanism.

2. The extractor system of claim 1 with the nose assembly having a u-joint.

3. The extractor system of claim 1 further including an extractor tube attached to the receiver assembly.

4. A push rod or duct rod assembly for use in installing a cable or conduit into a pressurized pipeline-comprising:
   a duct rod;
   a nose piece on the duct rod;
   a gland body having a seal, with the duct rod extending through the seal in the gland body; and
   a receiver assembly positionable through a pressure fitting on the pipeline with the receiver assembly including a latching mechanism for engaging onto the nose piece, when the nose piece and receiver assembly are engaged together.

5. The duct rod assembly of claim 4 with the gland body further including a threaded section adapted to engage onto a pipeline fitting.

6. An extractor tool comprising:
   an extractor tube;
   a handle attached adjacent a first end of the extractor tube;
   a lock rod axially displaceable within the extractor tube;
   a tube collar section at a second end of the a extractor tube;
   a socket axially displaceable within the tube collar section, and with the socket attached to the lock rod and one or more retainers associated with the socket; with the extractor tool adapted for extracting an end fitting through a pressure seal during routing of a duct rod, cable or conduit in a pressurized gas pipeline.

7. The extractor of claim 6 wherein the retainers are spring biased radially inwardly towards an axial centerline of the socket, for engaging and holding an end fitting on a cable, a conduit, or a duct rod.

8. The extractor of claim 6, wherein the socket is attached to the lock rod via a universal joint.

9. The extractor of claim 6 further including a latch on the extractor tube adjacent the first end of the extractor tube, with the latch engageable with the lock rod to secure the lock rod into a first position or into a second position.

10. The extractor of claim 6 further including a knob on the lock rod.

11. A receiver assembly comprising:
    a pull bar;
    a handle attached adjacent a first end of the pull bar;
    a socket extending into a sleeve attached to a second end of the pull bar;
    an insert axially displaceable within the socket and biased into a first position by an insert spring;
    a sleeve spring biasing the sleeve away from the second end of the pull bar and over the socket;
    a locking element between the sleeve and the socket; and
    a pawl pivotally attached to the pull bar, the pawl moveable from a first position, wherein the sleeve is positioned at least partially over the pawl, to a second position, wherein the pawl locks the sleeve against movement towards the first end of the pull bar, with the receiver assembly adapted for extracting an end fitting on a cable, a conduit, or a duct rod, from a pressurized pipeline.

12. A method for installing a cable or conduit into a pipeline, comprising the steps of:
    routing a first line having a first end fitting into the pipeline, from a first location;
    routing a second line having a second end fitting into the pipeline from a second location;
    sealing the first line and the second line adjacent to the first and second locations, respectively;
    maintaining gas flow and gas pressure within the pipeline;
    engaging the first end fitting with the second end fitting at an intermediate position within the pipeline, between the first and second locations; and
    pulling back on the first line until the second end fitting is adjacent to the first location, to install or route a duct rod, cable or conduit in the pipeline.

13. The method of claim 12 wherein the first end fitting comprises an end plug, and the second end fitting comprises a receptacle engageable around the end plug.

14. The method of claim 13 wherein the receptacle includes a conical section for guiding a first locking fitting on the end plug into a second locking fitting in the receptacle.

15. The method of claim 14 wherein the first locking fitting includes a groove on the end plug, and the second locking fitting comprises one or more locking balls or rings.

16. The method of claim 12 wherein the first and second end fittings comprise grappling fittings.

17. The method of claim 16 further including the step of moving the first end fitting in a first direction past the second end fitting, and then pulling the first end fitting back, in a second direction, opposite to the first direction, to engage the first end fitting to the second end fitting.

18. The method of claim 12 further comprising the step of installing a manipulator into the pipeline at the intermediate position, to assist in engaging the first and second end fittings.

19. The method of claim 12 further comprising the step of viewing the end fittings through a view port at the intermediate position.

20. The method of claim 12 further including the step of rotating at least one of the first and second end fittings, to engage the end fittings together.

21. A system for installing a cable or conduit into a pressurized gas pipeline, comprising:

a first pressure housing attachable to the pipeline and having a first seal;

a first line moveable through the first seal;

a first end fitting on the first line;

a second pressure housing attachable to the pipeline and having a second seal;

a second line moveable through the second seal;

a second end fitting on the second line, with the second end fitting engageable with the first end fitting;

wherein at least one of the first and second end fittings comprises a spiral end fitting.

22. The system of claim 21 wherein at least one of the first and second lines comprises a cable, a conduit, or a push rod.

23. The system of claim 21 wherein the first line is connected to a turning element for turning the first fitting into engagement with the second fitting.

24. An extractor system for installing or routing a duct rod, cable or conduit into a pipeline carrying a fluid under pressure, comprising:

a receiver assembly and a nose assembly;

a nose piece on the nose assembly; and the receiver assembly operatively associated with the pipeline and including guide means for guiding the nose piece into the receiver assembly, and latching means for latching onto the nosepiece, to hold the nosepiece onto or into the receiver assembly, after the nosepiece is guided into the receiver assembly, during installation or routing of a cable, conduit or duct rod in the pipeline.

25. An extractor system for installing or routing a duct rod, cable or conduit in a pressurized pipeline, comprising:

a receiver assembly and nose assembly;

the nose assembly attachable to a duct rod, cable or conduit and including, a nosepiece, with the nosepiece having at least one groove;

the receiver assembly moveable into the pipeline or into a pressure fitting on the pipeline, and the receiver assembly including a latching mechanism for engaging into the groove and a socket for guiding the nosepiece into the latching mechanism, with the receiver assembly further including an insert slidably positioned within the socket and an insert spring urging the insert in a first direction, a sleeve around the socket, and a socket spring urging the socket in the first direction and out of the sleeve; and at least one lock ball between the sleeve and the socket.

26. An extractor system for use in installing or routing a duct rod, cable or conduit into a pipeline carrying a fluid under pressure, comprising:

an end plug attachable to a duct rod, cable or conduit, with the end plug having a rounded end nose, a coupling feature, a conical guide collar, and a coupler groove between the end nose and the guide collar; and a coupler operatively associated with the pipeline and having a receptacle adapted to couple onto the end plug.

27. The extractor of claim 26 further including a neck section joined to the guide collar.

28. The extractor system of claim 26 with the receptacle further including a conical guide adapted to engage with the conical guide collar on the end plug.

29. The extractor system of claim 26 further including a groove on the receptacle, and ball bearings between a receptacle collar and the receptacle.

30. An extractor system for use in routing or installing a duct rod, cable or conduit into a pressurized pipeline, comprising:

an end plug attachable to a duct rod, cable or conduit and having an end nose and a coupling feature;

a coupler operatively associated with the pressurized pipeline and having a receptacle adapted to couple onto the end plug;

a collar, with the receptacle slidably positioned within the collar; and a spring biasing the receptacle into a first position.

31. An extractor system for use in installing a duct rod, cable or conduit into a pressurized pipeline, comprising:

an end plug attachable to the duct rod, cable or conduit and having an end nose and a coupling feature;

a coupler positionable in the pipeline or into a pressure fitting on the pipeline and having a receptacle adapted to couple onto the end plug; and a universal joint having a first side attached to the end plug and having a second side attachable to a duct rod, cable or conduit.

* * * * *